United States Patent
Matsui et al.

(10) Patent No.: US 8,982,135 B2
(45) Date of Patent: Mar. 17, 2015

(54) INFORMATION PROCESSING APPARATUS AND IMAGE DISPLAY METHOD

(75) Inventors: Kazuki Matsui, Kawasaki (JP); Kenichi Horio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 386 days.

(21) Appl. No.: 13/298,353

(22) Filed: Nov. 17, 2011

(65) Prior Publication Data

US 2012/0194542 A1 Aug. 2, 2012

(30) Foreign Application Priority Data

Jan. 31, 2011 (JP) ................................ 2011-017952

(51) Int. Cl.
| | | |
|---|---|---|
| G06F 15/16 | (2006.01) | |
| H04N 19/507 | (2014.01) | |
| G06F 3/14 | (2006.01) | |
| H04N 19/12 | (2014.01) | |
| H04N 19/137 | (2014.01) | |
| H04N 19/17 | (2014.01) | |

(52) U.S. Cl.
CPC ............ *H04N 19/507* (2014.11); *G06F 3/1454* (2013.01); *H04N 19/12* (2014.11); *H04N 19/137* (2014.11); *H04N 19/17* (2014.11)
USPC ........................................ 345/502; 382/236

(58) Field of Classification Search
None
See application file for complete search history.

(56) References Cited

U.S. PATENT DOCUMENTS

| | | | |
|---|---|---|---|
| 7,039,247 B2 | 5/2006 | Iwamura | |
| 8,171,169 B2 | 5/2012 | Bullard et al. | |
| 8,224,099 B2 * | 7/2012 | Mitsuhashi et al. | .......... 382/218 |
| 8,423,673 B2 | 4/2013 | Bullard et al. | |
| 2004/0151390 A1 * | 8/2004 | Iwamura | ....................... 382/236 |

FOREIGN PATENT DOCUMENTS

| | | |
|---|---|---|
| EP | 2387203 | 11/2011 |
| JP | 2004-086550 A | 3/2004 |
| JP | 2004-349965 A | 12/2004 |
| JP | 2007-505580 | 3/2007 |
| JP | 2007-265209 A | 10/2007 |

(Continued)

OTHER PUBLICATIONS

Extended European Search Report mailed by EPO and corresponding to European application No. 11189994.4 on Jul. 18, 2012.

(Continued)

*Primary Examiner* — Devona Faulk
*Assistant Examiner* — William Beutel
(74) *Attorney, Agent, or Firm* — Fujitsu Patent Center

(57) ABSTRACT

A server device 10 includes a frame buffer 13 that stores the image; an encoder 14*e* that compresses the image; a whole screen moving image conversion determination unit 14*m* that detects, from the image, a moving image area to be compressed by using the encoder 14*e*; a screen generator 14*b* that compresses the image such that image degradation is lower than that of the encoder 14*e*; a high frequency screen update area identifier 14*n* that detects, from an area compressed by the encoder 14*e*, a change area that has changed and calculates an accumulated change area by accumulating the change area; and a transmitter that transmits, to a client terminal 20, a moving image by compressing the moving image area detected by the moving image area and the detected change area and an image of the accumulated change area that is compressed by the screen generator 14*b*.

7 Claims, 16 Drawing Sheets

(56) References Cited

FOREIGN PATENT DOCUMENTS

| | | |
|---|---|---|
| JP | 2008-538829 A | 11/2008 |
| JP | 2008-539449 A | 11/2008 |
| JP | 2009-194626 A | 8/2009 |
| JP | 2010-118976 A | 5/2010 |
| WO | WO-2005/029864 | 3/2005 |

OTHER PUBLICATIONS

Japanese Office Action mailed Aug. 5, 2014 for corresponding Japanese Patent Application 2011-017952, with English Translation, 4 pages.

\* cited by examiner

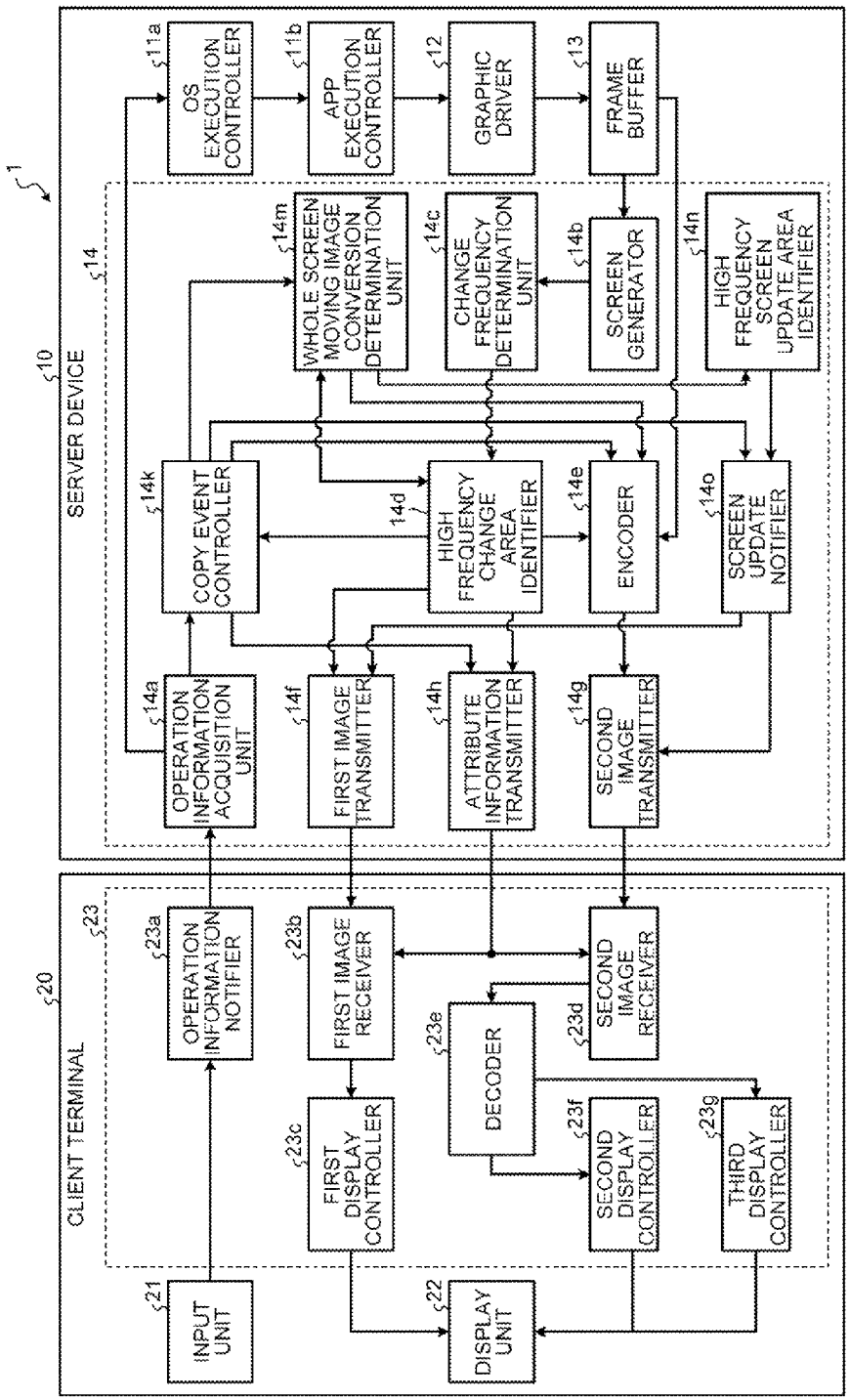

FIG.4
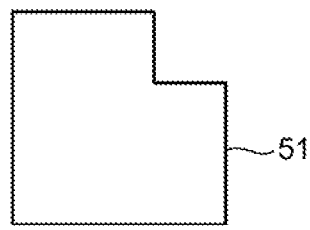
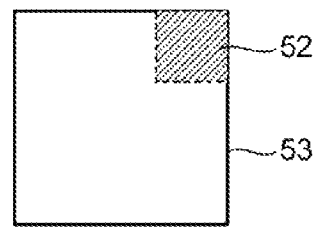
FIG.5
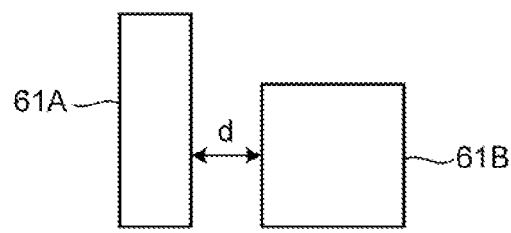
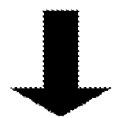
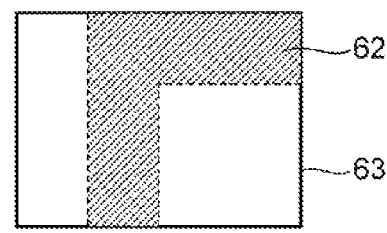

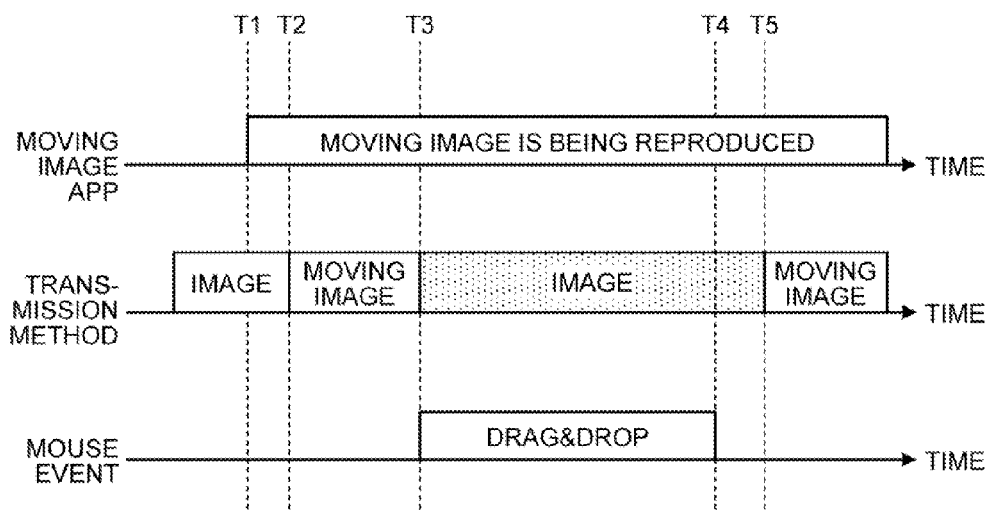
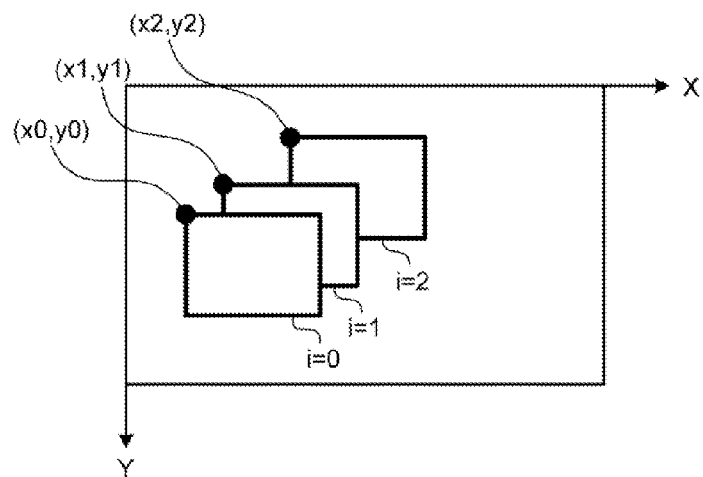

INFORMATION PROCESSING APPARATUS AND IMAGE DISPLAY METHOD

CROSS-REFERENCE TO RELATED APPLICATION

This application is based upon and claims the benefit of priority of the prior Japanese Patent Application No. 2011-017952, filed on Jan. 31, 2011, the entire contents of which are incorporated herein by reference.

FIELD

The embodiment discussed herein is directed to an information processing apparatus, an image transmission program, and an image display method.

BACKGROUND

Systems referred to as "thin client" systems are known. A thin client system is configured such that a client is given only minimum functions and a server manages the resources, such as applications and files.

In a thin client system, although the client is caused to display the result of a process executed by the server and display the data stored in the server, it appears that the client itself is actually executing processes and storing data.

For example, in the thin client system, the server is caused to execute work-related applications for, for example, data production and mail handling and the client is caused to display the results of the processes of the applications. There is a requirement to extend the range of applications that the thin client system uses to, in addition to such work applications, applications to deal with fine images, such as in computer-aided design (CAD), and further to applications to deal with moving images.

However, when the volume of data, such as that for images or moving images, is dealt with by using a protocol used for communications in a thin client system, such as with virtual network computing (VNC), the response to operations executed by the client may be degraded.

Thus, the following technology is an example of technology that has been proposed to improve operation responses. In this technology, a server hooks the output of a specific media application and transmits the data dealt with by the media application to a client. On the other hand, the client performs a process of reproducing the data dealt with by the media application running on the server.

Patent Document 1: Japanese National Publication of International Patent Application No. 2007-505580
Patent Document 2: Japanese Laid-open Patent Publication No. 2009-194626
Patent Document 3: Japanese Laid-open Patent Publication No. 2010-118976

Images reproduced by the client using moving image data degrade compared to images reproduced using still image data. Thus, when transmission of moving image data ends, the server may transmit still image data.

However, even in the above-described conventional technology, in a case where the moving image data dealt with by the media application is in a large volume, there is a problem in that, if still image data of the same area as that of the moving image data is transmitted when transmission of the moving image data ends, the width of the transmission band increases.

SUMMARY

According to an aspect of an embodiment of the invention, an information processing apparatus includes an image memory that stores the image; a first compressor that compresses the image in the image memory in each period of time; a moving image area detector that detects, from the image stored in the image memory, a moving image area to be compressed by using the first compressor; a second compressor that compresses the image in the image memory such that image degradation is lower than that of the first compressor; a change area detector that detects, from an area that is compressed by the first compressor, a change area that has changed; a calculator that accumulates the change area and calculates an accumulated change area; and a transmitter that transmits, to the terminal device, a moving image obtained by the first compressor by compressing the moving image area detected by the moving image area and the change area detected by the change area detector and that transmits, when the transmitting of the moving image ends, an image of the accumulated change area calculated by the calculator, the image of the accumulated change area being compressed by the second compressor.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 1 is a block diagram of a configuration of each device included in a thin client system according to an embodiment;

FIG. 4 is a diagram illustrating how to correct a mesh combination;

FIG. 5 is an illustration of how to synthesize high frequency change area candidates;

FIG. 7 is a diagram of an example of a method of transmitting an image that is transmitted by a server device to a client terminal when a window moves;

FIG. 8 is a diagram illustrating a method of calculating a position of a copy area;

DESCRIPTION OF EMBODIMENT

Figure 2A:
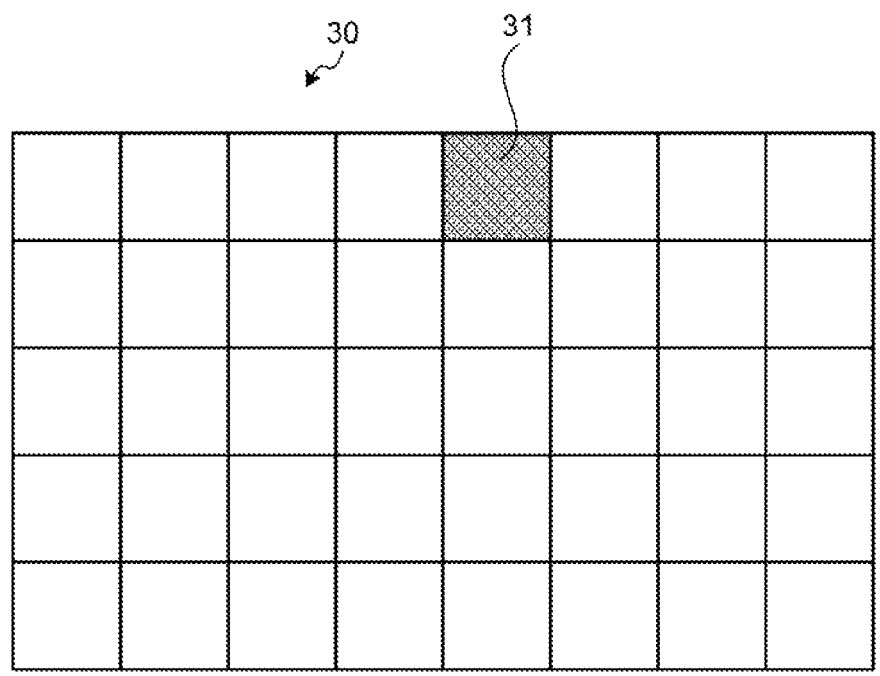
FIG. 2A is a diagram illustrating how a desktop screen is divided.

Preferred embodiment of the present invention will be explained with reference to accompanying drawings. The embodiment does not limit the invention.

System Configuration

FIG. 1 illustrates a thin client system according to an embodiment. FIG. 1 is a block diagram of a configuration of each device included in the thin client system according to the embodiment.

A thin client system 1 in FIG. 1 causes a server device 10 to remotely control a screen displayed by a client terminal 20. In other words, while the thin client system 1 causes the client terminal 20 to display the results of processes that are in fact executed by the server device 10 and data stored in the server device 10, it appears that the client terminal 20 itself is actually executing processes and storing data.

As illustrated in FIG. 1, the thin client system 1 includes the server device 10 and the client terminal 20. In the example in FIG. 1, one client terminal is connected to the single server device 10, but any arbitrary number of client terminals can be connected to the server device 10.

The server device 10 and the client terminal 20 are connected via a predetermined network so as to be communicable with each other. An arbitrary type of commutation network, such as the Internet, a local area network (LAN), and a virtual private network (VPN), can be used for the network regardless of it being wired or wireless. It is assumed that, for example, a remote frame buffer (RFB) protocol in a VNC is used for the communication protocol between the server device 10 and the client terminal 20.

The server device 10 is a computer that provides services to remotely control the screen displayed on the client terminal 20. An application for servers to perform remote screen control is installed or pre-installed in the server device 10. Hereinafter, the application for the server to perform the remote screen control is referred to as the "server remote screen control APP".

The server remote screen control APP has a basic function of providing remote screen control services. For example, the server remote screen control APP acquires information on an operation of the client terminal 20 and then causes an application running on the client terminal 20 to execute a process that is requested by the operation. The server remote screen control APP then generates a screen for displaying the result of the process executed by the application and then transmits the screen to the client terminal 20. Before the server remote screen control APP generates the current screen, the server remote screen control APP transmits an area of an assembly of images of parts that have changed from a bitmap image displayed on the client terminal 20, i.e., transmits an image of an update rectangle. Hereinafter, a case in which an image of an updated part is formed in a rectangular image will be described as an example. However, the disclosed apparatus can be also applied to a case in which an image of an updated part can be formed in a shape other than a rectangular shape.

Furthermore, the server remote screen control APP also has a function of compressing data of a part that significantly moves between frames to data compressed by a system for moving images and then transmitting the compressed data to the client terminal 20. For example, the server remote screen control APP divides the screen, which is generated according to the result of the process executed by the application, into a plurality of areas and monitors the frequency of change (change frequency) of each of the divided areas. The server remote screen control APP transmits attribute information on areas whose change frequency exceeds a threshold, i.e., attribute information on a high frequency change area, to the client terminal 20. In addition, the server remote screen control APP encodes a bitmap image of the high frequency change area into data in an MPEG format, such as MPEG-2 or MPEG-4, and then transmits the encoded data to the client terminal 20. Here, the case in which moving picture experts group (MPEG) data compression is performed is illustrated. However, the data compression is not limited to this. For example, any arbitrary compression encoding system, such as a motion joint photographic experts group (Motion-JPEG) can be used as long as it is a moving-image compression system.

The client terminal 20 is a computer that receives remote screen control services from the server device 10. In addition to fixed terminals, such as a personal computer, mobile terminals, such as a mobile phone, a personal handyphone system (PHS), or a personal digital assistant (PDA), are examples of what can be used as the client terminal 20. A remote screen control APP for a client can be installed or pre-installed in the client terminal 20. Hereinafter, the application for the client to perform remote screen control is referred to as a client remote screen control APP.

The client remote screen control APP has a function of notifying the server device 10 of the operation information that is received via various input devices, such as a mouse and a keyboard. For example, the client remote screen control APP gives, as operation information, notice of left and right click, double click, and drag of the mouse and a position and amount of movement of a mouse cursor, which are obtained via a mouse moving operation. For a further example, notice of the amount of rotation of the mouse wheel or the type of a pushed key on the keyboard is given as operation information.

Furthermore, the client remote screen control APP has a function of displaying images that are received from the server device 10 on a predetermined display unit. For example, when a bitmap image of an update rectangle is received from the server device 10, the client remote image control APP displays the image of the update rectangle according to a position of the change from the previous bitmap image. For a further example, when the client remote screen control APP receives attribute information of a high frequency change area from the server device 10, the client remote screen control APP sets the area on the display screen corresponding to a position contained in the attribute information as a blank area not to be displayed on the bitmap image. Then, when the client remote image control APP receives the data compressed by the system for moving images, the client remote image control APP decodes the data and displays the data in the blank area.

Server Configuration

A configuration of the server device according to the embodiment will be described. As depicted in FIG. 1, the server device 10 includes an OS execution controller 11a, an APP execution controller 11b, a graphic driver 12, a frame buffer 13, and a server remote screen controller 14. In the example in FIG. 1, the server device 10 includes, in addition to the functional units in FIG. 1, various functional units of conventional computers, such as the functions of various input devices.

The OS execution controller 11a is a processor that controls execution of an operation system (OS). For example, from the operation information acquired by an operation information acquisition unit 14a described below, the OS execution controller 11a detects an instruction for starting an application or a command for the application. For example, when the OS execution controller 11a detects a double click on an icon of the application, the OS execution controller 11a instructs the APP execution controller 11b described below to start the application corresponding to the icon. For a further example, when the OS execution controller 11a detects an operation of requesting execution of a command on the operation screen, i.e., on the window, of the application in operation, the OS execution controller 11a instructs the APP execution controller 11b to execute the command. Hereinafter, the application is abbreviated as APP.

The APP execution controller 11b is a processor that controls execution of the application according to an instruction from the OS execution controller 11a. For example, when the OS execution controller 11a issues an instruction for starting the APP or when the application in operation is instructed to execute a command, the APP execution controller 11b causes the APP to run. The APP execution controller 11b then issues, to the graphic driver 12 described below, a request for drawing, on the frame buffer 13, an image for displaying the process result obtained by executing the APP. When issuing a drawing request to the graphic driver 12 as described above, the APP execution controller 11b notifies the graphic driver 12 of the image for display and a position in which the image for display is drawn.

The APP that the APP execution controller 11b executes may be pre-installed or installed after the shipment of the server device 10. Alternatively, the APP may be one running in, for example, a JAVA (trademark) network environment.

The graphic driver 12 is a processor that executes a process for drawing on the frame buffer 13. For example, when the graphic driver 12 accepts the drawing request from the APP execution controller 11b, the graphic driver 12 draws the image for displaying the result of the APP in a drawing position on the frame buffer 13, which is a position specified by the APP, by using a bitmap format. Here, a case is described in which the drawing request is accepted by the APP. Alternatively, a drawing request from the OS execution controller 11a may be accepted. For example, upon accepting a drawing request concerning the mouse cursor from the OS execution controller 11a, the graphic driver 12 draws an image for displaying the mouse cursor in the drawing position on the frame buffer 13, which is a drawing position specified by the OS, by using the bitmap system.

The frame buffer 13 is a storage device that stores bitmap data that is drawn by the graphic driver 12. Semiconductor memories, such as random access memories (RAM) including a video random access memory (VRAM), a read only memory (ROM), and a flash memory can be taken as one mode of the frame buffer 13. The frame buffer 13 may use a storage device, such as a hard disk or an optical disk.

The server remote screen controller 14 is a processor that provides the remote screen control services to the client terminal 20 via the server remote screen control APP. As depicted in FIG. 1, the server remote screen controller 14 includes the operation information acquisition unit 14a, a screen generator 14b, a change frequency determination unit 14c, a high frequency change area identifier 14d, an encoder 14e, a first image transmitter 14f, and a second image transmitter 14g. The server remote screen controller 14 further includes an attribute information transmitter 14h, a copy event controller 14k, and a whole screen moving image conversion determination unit 14m. Furthermore, the server remote screen controller 14 includes a high frequency screen update area identifier 14n and a screen update notifier 14o.

The operation information acquisition unit 14a is a processor that acquires operation information from the client terminal 20. Left and right click, double click, and drag of the mouse and the position and a amount of movement of the mouse cursor, which are obtained via a mouse moving operation, can be taken as an example of the operation information.

The screen generator 14b is a processor that generates an image of a screen that is displayed on a display unit 22. For example, each time the graphic driver 12 stores bitmap data in the frame buffer 13, the screen generator 14b starts the following process. In other words, the screen generator 14b compares the desktop screen that the client terminal 20 is caused to display when the previous frame is generated with the desktop screen that is written on the frame buffer 13 when the current frame is generated. The screen generator 14b then generates an image of an update rectangle that is obtained by connecting pixels of a part having changed from the previous frame and by forming the part into a rectangle and the screen generator 14b generates packets for transmitting the update rectangle. The screen generator 14b may compress the image on the frame buffer 13 such that the image degradation is lower than that of the encoder 14e described below.

The change frequency determination unit 14c is a processor that determines the frequency of change between frames regarding each of the areas that are obtained by dividing the image that is drawn on the frame buffer 13. For example, the change frequency determination unit 14c stores the update rectangle, which is generated by the screen generator 14b, in a work internal memory (not illustrated) for a predetermined period of time. The change frequency determination unit 14c stores the attribute information that can specify a position and size of the update rectangle, the coordinates of the upper left top point of the update rectangle, and the width and height of the update rectangle. The period in which the update rectangle is stored has a correlation with the accuracy of identifying a high frequency change area. A longer period reduces erroneous detection of a high frequency change area. Here, an example is assumed in which an image of an update rectangle is stored for one second.

When a predetermined period of time has elapsed since an image of an update rectangle was stored, the change frequency determination unit 14c determines, by using a map that is obtained by dividing the desktop screen into meshes, the change frequency of the desktop screen that the client terminal 20 is caused to display.

Figure 2B:
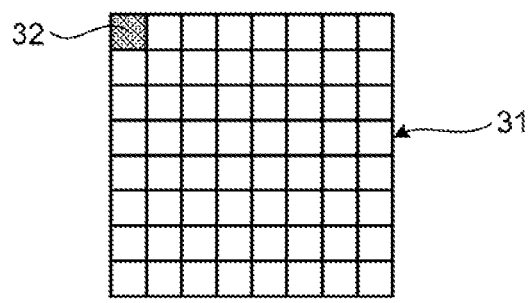
FIG. 2B is a diagram illustrating how a desktop screen is divided.

FIG. 2A and FIG. 2B are a diagram illustrating how the desktop screen is divided. The reference numeral 30 in FIG. 2A denotes a map for determining the change frequency. The reference numeral 31 in FIG. 2A and FIG. 2B denotes a mesh contained in the map 30. The reference numeral 32 in FIG. 2B denotes one pixel that is contained in the block of pixels that form the mesh 31. In the example in FIG. 2A and FIG. 2B, a case is assumed where the change frequency determination unit 14c divides pixels that occupy the map 30 into blocks each consisting of 8×8 pixels as a mesh. In this case, one mesh contains 64 pixels.

Here, according to the position and size of the update rectangles stored in the work internal memory, the change frequency determination unit 14c sequentially loads images of update rectangles to the map for determining the change frequency. Each time the change frequency determination unit 14c loads an update rectangle to a map, the change frequency determination unit 14c accumulates and increments the number of times the mesh overlapping the update rectangle on the map changes. When the update rectangles, which are loaded on the map, overlap a pixel(s) contained in a mesh for a predetermined number of times, the change frequency determination unit 14c increments by one the number of times the mesh has changed. Here, a description will be provided assuming that, when the update rectangle overlaps even one pixel contained in the mesh, the number of times the mesh has changed is incremented.

Figure 3A:
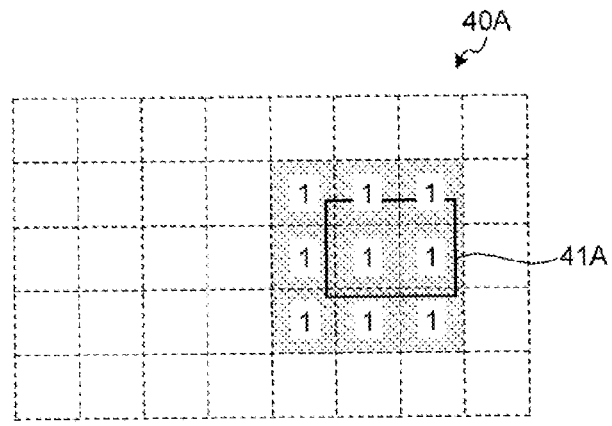
FIG. 3A is a diagram illustrating how to determine the change frequency of the desktop screen.
Figure 3B:
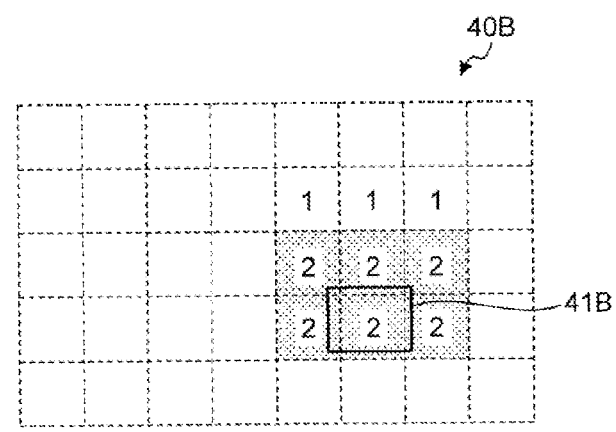
FIG. 3B is another diagram illustrating how to determine the change frequency of the desktop screen.
Figure 3C:
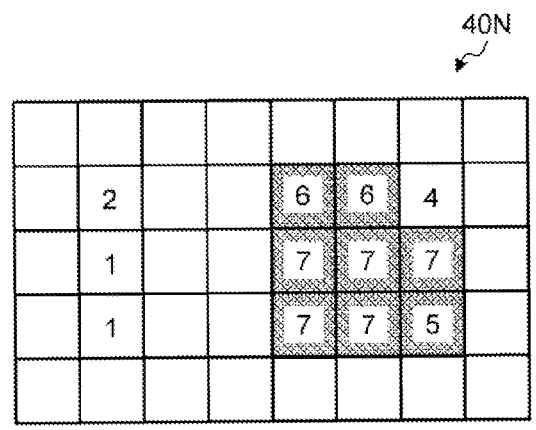
FIG. 3C is a further diagram illustrating how to determine the change frequency of the desktop screen.

FIGS. 3A to 3C are diagrams illustrating how to determine the frequency of change of the desktop screen. The reference numerals 40A, 40B, and 40N in FIGS. 3A to 3C denote maps for determining the change frequency. The reference numerals 41A and 41B in FIGS. 3A and 3B denote update rectangles. Here, the numbers in the meshes of the map 40A each represent the number of times the mesh has changed at the time when the update rectangle 41A is loaded. The numbers in the meshes of the map 40B each represent the number of times the mesh has changed at the time when the update rectangle 41B is loaded. The numbers in the meshes of the map 40N each represent the number of times the mesh has changed at the time when the update rectangles stored in the work internal memory are all loaded. The meshes where no number is represented in FIGS. 3A to 3C represent that the number of the mesh has changed is zero.

As depicted in FIG. 3A, when the update rectangle 41A is loaded on the map 40A, the meshes of the shaded part overlap the update rectangle 41A. Thus, the change frequency determination unit 14c increments by one the number of times each of the meshes of the shaded part has changed. In this case, because the number of times each mesh is changed is zero, the number of times the shaded part has changed is incremented from 0 to 1. Furthermore, as depicted in FIG. 3B, when the update rectangle 41B is loaded on the map 40B, the meshes of the shaded part overlap the update rectangle 41B. Thus, the change frequency determination unit 14c increments by one the number of times each of the meshes of the shaded part has changed. In this case, because the number of times each mesh has changed is 1, the number of times each of the meshes of the shaded part has changed is incremented from 1 to 2. When all the update rectangles are loaded on the map, the result of the map 40N in FIG. 3C is obtained.

When the change frequency determination unit 14c finishes loading all the update rectangles stored in the work internal memory, the change frequency determination unit 14c acquires meshes for which the number of times each mesh has changed, i.e., the change frequency, in a predetermined period, exceeds a threshold. In the example in FIG. 3C, if the threshold is "4", the meshes in the shaded part are acquired. If the value of the threshold is set higher, a part in which a moving image is highly likely to be displayed on the desktop screen can be encoded by the encoder 14e described below. The "threshold" can be a value that is gradually set by the developer of the server remote screen control APP and that an end user is allowed to select or a value that an end user can directly set.

Now, the description will be back to FIG. 1. The high frequency change area identifier 14d is a processor that identifies, as a high frequency change area, an area of the desktop screen displayed on the client terminal 20 that is an area that is highly frequently changed.

When the change frequency determination unit 14c acquires meshes for which the number of times each mesh has changed exceeds the threshold, the high frequency change area identifier 14d derives an interpolation area that is interpolated into a mesh combination obtained by combining adjacent meshes. The high frequency change area identifier 14d then corrects the mesh combination to a rectangle by adding the derived interpolation area to the mesh combination. An algorithm for deriving an area with which a mesh combination is formed into a rectangle by minimum interpolation is used for deriving the interpolation area.

FIG. 4 is a diagram illustrating how to correct a mesh combination. The reference numeral 51 in FIG. 4 denotes a mesh combination before correction. The reference numeral 52 in FIG. 4 denotes an interpolation area. The reference numeral 53 in FIG. 4 denotes a corrected rectangle. As depicted in FIG. 4, by adding the interpolation area 52 to the mesh combination 51, the high frequency change area identifier 14d corrects the mesh combination 51 to the rectangle 53. At this stage, synthesizing the rectangle described below is not completed yet. Because the rectangle 53 is not determined to be a high frequency change area yet, the corrected rectangle is referred to as a high frequency change area candidate.

When there are a plurality of high frequency change area candidates, the high frequency change area identifier 14d synthesizes a rectangle that contains the high frequency change area candidates between which the distance is equal to or less than a predetermined value. The distance between high frequency change area candidates is the minimum distance between corrected rectangles. For example, to synthesize high frequency change area candidates, the high frequency change area identifier 14d derives an interpolation area to fill in the gap between the candidates. The high frequency change area identifier 14d then adds the derived interpolation area to the high frequency change area candidates, thereby synthesizing a rectangle containing the high frequency change area candidates. The interpolation area is derived by using an algorithm for deriving an area with which high frequency change area candidates are formed into a synthesis by the minimum interpolation.

FIG. 5 is an illustration of how to synthesize high frequency change area candidates. The reference numerals 61A and 61B in FIG. 5 denote high frequency change area candidates. The reference numeral 62 in FIG. 5 denotes an interpolation area. The reference numeral 63 in FIG. 5 denotes a synthesis of the high frequency change area candidate 61A and the high frequency change area candidate 61B. As depicted in FIG. 5, if the distance d between the high frequency change area candidate 61A and the high frequency change area candidate 61B is equal to or less than a predetermined distance, the high frequency change area identifier 14d adds the interpolation area 62, thereby synthesizing a synthesis 63 that includes the high frequency change area candidate 61A and the high frequency change area candidate 61B. The high frequency change area identifier 14d identifies the thus obtained synthesis as a high frequency change area.

Once the high frequency change area is identified, the high frequency change area identifier 14d outputs attribute information with which a position and size of the high frequency change area can be identified to the attribute information transmitter 14h described below. By causing the attribute information transmitter 14h to notify the client terminal 20 of the attribute information on the high frequency change area, the part of the bitmap data on the desktop screen displayed on the client terminal 20, which is the part corresponding to the high frequency change area, is displayed blank. Thereafter, for the meshes mapped in the work internal memory, after incrementing the number of times each of the meshes has changed in a whole screen moving image conversion determination map, which will be described below, the high frequency change area identifier 14d clears the whole screen moving image conversion determination map. The high frequency change area identifier 14d registers the attribute information of the high frequency change area in the work internal memory.

Each time the screen generator 14b generates an update rectangle, the high frequency change area identifier 14d determines whether the update rectangle is included in the high frequency change area stored in the work internal memory, i.e., the area for which a moving image is being transmitted by the second image transmitter 14g. When the update rectangle is not included in the high frequency change area, the high frequency change area identifier 14d causes the first image transmitter 14f describe below to transmit the image of and attribute information on the update rectangle. In contrast, when the update rectangle is included in the high frequency change area, the high frequency change area identifier 14d basically does not cause the first image transmitter 14f described below to transmit the update rectangle and the attribute information. As an exception, if the update rectangle is of the mouse and is drawn by the OS execution controller 11a, the image of and the attribute information on the update rectangle related to the mouse may be transmitted.

Each time bitmap data is drawn on the frame buffer 13, the high frequency change area identifier 14d determines whether the attribute information on the high frequency change area in the work internal memory is registered. When the attribute information on the high frequency change area is registered, the high frequency change area identifier 14d cuts out, from the bitmap data drawn on the frame buffer 13, a bit map image of a portion corresponding to the high frequency change area. The high frequency change area identifier 14d then outputs the bitmap image to the encoder 14e.

The encoder 14e is a processor that encodes an image. For example, the encoder 14e encodes the image of the high frequency change area, which is the image input from the high frequency change area identifier 14d. In this case, when the bit map image of the high frequency change area input from the high frequency change area identifier 14d reaches the number of frames with which a stream can be formed, the encoder 14e encodes the bitmap image of the high frequency change area. One mode of the encoding system includes an MPEG system, such MPEG-2 or MPEG-4 and a Motion-JPEG system.

The first image transmitter 14f is a processor that transmits the image of and attribute information on the update rectangle, which is generated by the screen generator 14b, to the client terminal 20. For example, an RFB protocol of VNC is used for a communication protocol when the update rectangle is transmitted.

The second image transmitter 14g is a processor that transmits the encoded image that is encoded by the encoder 14e and the attribute information to the client terminal 20. For example, a real time transport protocol (RTP) can be used as a communication protocol for transmitting the encoded image.

The attribute information transmitter 14h is a processor that transmits the attribute information of an image to the client terminal 20. For example, when the high frequency change area identifier 14d identifies the high frequency change area, the attribute information transmitter 14h transmits the attribute information with which the position and size of the high frequency change area can be specified. Accordingly, the part of the bitmap data on the desktop screen displayed on the client terminal, which is the part corresponding to the high frequency change area, is displayed blank.

Figure 6A:
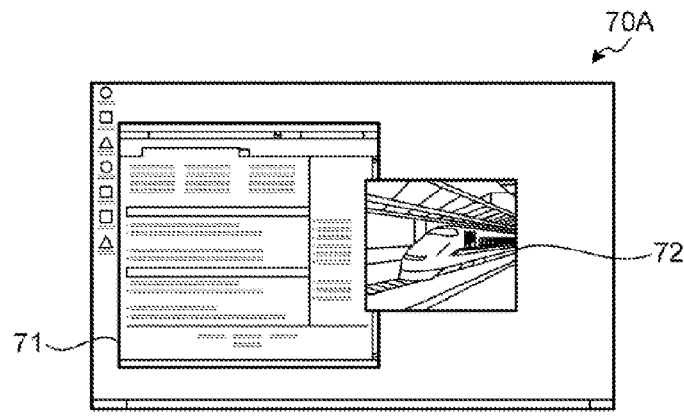
FIG. 6A is a diagram illustrating how to give notice of attribute information on a high frequency change area.
Figure 6B:
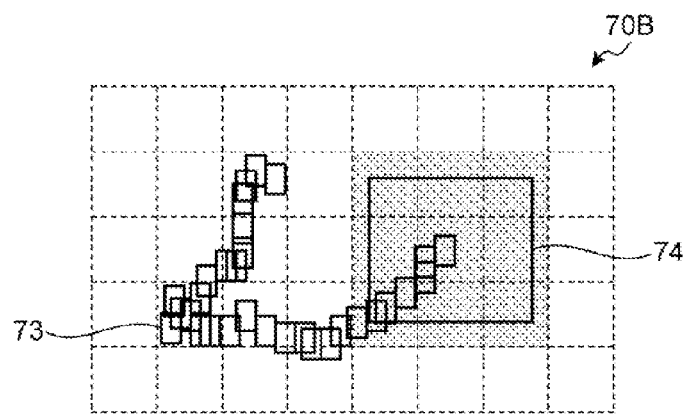
FIG. 6B is a diagram illustrating how to give notice of the attribute information on the high frequency change area.
Figure 6C:
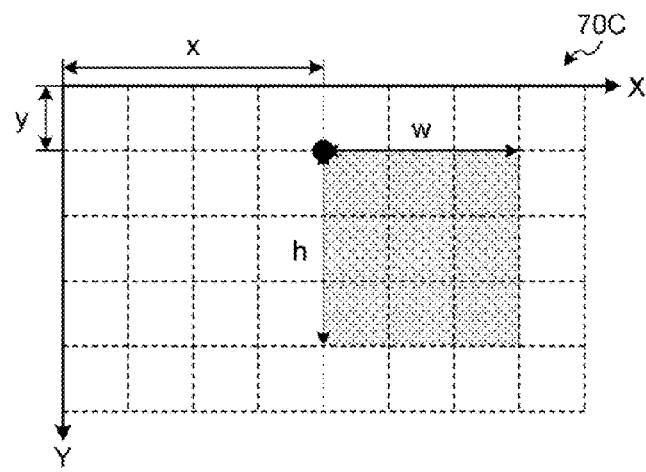
FIG. 6C is a diagram illustrating how to give notice of the attribute information on the high frequency change area.

FIGS. 6A to 6C are diagrams illustrating how to give notice of the attribute information on the high frequency change area. The reference numeral 70A in FIG. 6A denotes an example of a desktop screen that is drawn on the frame buffer 13. The reference numerals 70B and 70C in FIGS. 6B and 6C denote maps for determining the change frequency. The reference numeral 71 in FIG. 6A denotes a browser screen. The reference numeral 72 in FIG. 6A denotes a moving image reproduction screen. The reference numeral 73 in FIG. 6B denotes a movement locus of the mouse. The reference numeral 74 in FIG. 6B denotes an area for which a moving image is reproduced by the application.

As depicted in FIG. 6A, the desktop screen 70A contains the browser screen 71 and the moving image reproduction screen 72. When chronological changes are traced from the desktop screen 70A, as depicted in FIG. 6B, no update rectangle of the browser screen 71, which is a still image, is detected and the movement locus 73 of the mouse and update rectangles related to the moving image reproduction area 74 are detected. It is assumed that meshes that have changed more times than the threshold in the moving image reproduction area 74, i.e., the shaded part in FIG. 6B, are identified by the high frequency change area identifier 14d. In this case, the attribute information transmitter 14h transmits, as the attribute information on the high frequency change area, the coordinates (x,y) of the upper left top point of the high frequency change area of the shaded part in FIG. 6C and the width w and height h of the high frequency change area to the client terminal 20. Here, a case is illustrated in which the coordinates of the upper-left top point are used as a point specifying the position of the high frequency change area. Alternatively, other top points may be used. Alternatively, an arbitrary point other than top points, such as the center of gravity, can be used as long as the point can identify the position of the high frequency change area. Here, a case is described in which the upper left part on the screen serves as the origin of the coordinate axes X and Y. Alternatively, any arbitrary point in or outside the screen can be the origin.

As described above, without depending on a specific application, the server device 10 identifies, as a high frequency change area, an area for which a compression system for moving images is used. Furthermore, while transmitting an image of a changed part of the area other than the high frequency change area, the server device 10 compresses the image corresponding to the high frequency change area to data of the compression system for moving images. Thus, while reducing the volume of data focusing on, out of the images transmitted to the client terminal 20, an image that fundamentally deteriorates the operation response, the server device 10 can minimize the load of the encoder that performs the compression process and of the decoder that performs the decoding process in the terminal device. Accordingly, the server device 10 can improve the operation response while maintaining the general versatility of the thin client.

However, the server device 10 requires a certain period of time to identify a high frequency change area. Thus, even if a change of significant movement is drawn between frames of an image drawn on the frame buffer 13, when the change is for a short period of time, the area in which the change occurs may not be identified as a high frequency change area.

For example, when a window is moved, the movement of the window may not be followed and the client terminal 20 may not smoothly display the moving image. FIG. 7 is a diagram of an example of a system of transmitting an image to be transmitted by the server device to the client terminal when a window moves. In the example in FIG. 7, it is assumed that, when a moving image APP reproduces moving images, the title bar of the window is dragged and dropped.

As represented in FIG. 7, before Time T1 at which the moving image APP reproduces a moving image, the window stops and thus a changed part between frames is transmitted as an image of an update rectangle from the server device 10 to the client terminal 20. At Time T1, the moving image APP starts reproducing a moving image. Thereafter, at Time T2, the server device 10 identifies the window as a high frequency change area and an image of the window is transmitted as a moving image to the client terminal 20.

However, at Time T3, the window is started to be moved by dragging and dropping the title bar of the window. Accordingly, because a portion of significant movement moves according to the movement of the window, the window is not identified as a high frequency change area although a moving image is reproduced. From Time T4, the time at which the movement of the window stops, until Time T5, the window is not identified as a high frequency change area. At time T5, the server device 10 identifies the window as a high frequency change area and transmission of the image of the window as a moving image to the client terminal 20 is started.

As described above, when the window is moved, a moving image that is to be played by the moving image APP is transmitted as an update rectangle to the client terminal for the period of time indicated by the shaded part in FIG. 7, which lowers the operation response.

To deal with the movement of the window, the server device 10 according to the embodiment follows the movement of the window by generating a copy event. The copy event is an event generated when the actual window is moved and in which a pseudo copy area regarded as the window is moved according to the movement locus of the mouse.

In other words, the server device 10 according to the embodiment transmits, to the client terminal 20, attribute information with which a position and size of the copy area following the movement of the window can be identified, and the server device 10 converts the image drawn in the copy area on the frame buffer 13 to a moving image and transmits the moving image.

Accordingly, the image of the copy area with significant movement can be compressed without generating a large volume of update rectangles and the compressed image can be transmitted to the client terminal 20, which improves the operation response when the window moves.

However, if the window moves over a large part of the screen of the client terminal 20, the load of the server device 10 in the case where only a part of the copy area of the screen is converted to a moving image and the moving image is transmitted to the client terminal 20 may be greater than the load in the case where the whole screen is converted to a moving image and the moving image is transmitted. This is because, to identify the above-described high frequency change area, it is necessary to map onto the memory update rectangles that are stored for a predetermined time. Particularly, in the case of a small mobile terminal device, such as a smartphone, because the size of the screen is small, it may be more effective to transmit the whole screen as a moving image.

For this reason, when the server device 10 according to the embodiment transmits the updated part of the screen drawn on the frame buffer 13 to the client terminal 20, if the updated area or the frequency of update (update frequency) of the screen becomes equal to or more than a threshold because of the window movement, the whole screen is converted to a moving image and the moving image is transmitted. Accordingly, the server device 10 can convert the whole screen to a moving image if the processing load of the server device 10 is reduced by converting the whole screen to a moving image and transmitting the moving image. Accordingly, the server device 10 according to the embodiment can improve the response of the window movement.

An image for which a moving image is reproduced by the client terminal 20 degrades compared to an image for which an update rectangle is reproduced. Thus, when transmission of the moving image ends, the server device 10 may need to transmit an update rectangle corresponding to the area of the moving image. In such a case, when the server device 10 converts the whole screen to a moving image and transmits the moving image and then the transmission of the moving image ends, the server device 10 transmits an update rectangle corresponding to the area of the whole screen. Accordingly, when the transmission of the moving image ends, the width of the transmission band is increased.

For this reason, when the updated area and update frequency in the screen becomes equal to or more than the threshold because of the window movement, while converting the whole screen to a moving image and transmitting the moving image, the server device 10 according to the embodiment transmits the update area in the whole screen, which is the area with an actual change. Furthermore, the server device 10 according to the embodiment accumulates the update areas from the start of updating the screen until completion of the update and, when transmission of the moving image ends, the server device 10 transmits the update rectangle of the accumulated update area. Accordingly, when transmission of the moving image ends, the server device 10 according to the embodiment can transmit the update rectangle of only the update area during the moving image conversion. Accordingly, the server device 10 according to the embodiment can reduce an increase in the width of the transmission band when transmission of the moving image ends.

Now, the description goes back to FIG. 1. The copy event controller 14k that achieves the above-described copy event and the whole screen moving image conversion determination unit 14m that converts the whole screen to a moving image will be described. The copy event controller 14k is a processor that controls generation, execution, and the end of a copy event.

The time when a copy event is generated will be described below. The copy event controller 14k determines whether the high frequency change area, which is identified by the high frequency change area identifier 14d, is in a predetermined size of, for example, 50×50 pixels or more. In this case, when the high frequency change area is in a predetermined size or more, the copy event controller 14k further determines whether a specific mouse event is detected, i.e., whether drag and drop are acquired by the operation information acquisition unit 14a. When the specific mouse event is detected, the copy event controller 14k generates a copy event. Here, the case is described where, according to the mouse event, it is determined whether a copy event can be generated. Alternatively, it can be determined whether a copy event can be generated by operating a tablet or a keyboard.

As described above, when there is a high frequency change area of a predetermined size or more, the possibility that the window containing the moving image is drawn on the frame buffer 13 increases. In such a case, when an operation for moving the window is acquired, it can be assumed that there is no operation to move the window containing a moving image. Thus, without collecting particular information from the OS, a copy event can be generated at an appropriate time.

The time when the copy event is ended will be described. The copy event controller 14k determines whether the specific mouse event is detected. When no specific mouse event is detected anymore, i.e., when the operation of moving the window ends, the copy event controller 14k ends the copy event. When the operation of moving the window ends, the operation information indicating that the left click included in the drag operation is released is acquired by the operation information acquisition unit 14a described below. Also when no notice has been given of an update rectangle of the mouse cursor for a predetermined period or time, it can be understood that the operation of moving the window ends.

The process that is executed by the copy event will be described. When the operation information acquisition unit 14a acquires the amount of movement of the mouse, the copy event controller 14k calculates a position of the current copy area according to the position of the copy area obtained by executing the previous copy event and the currently-acquired amount of movement of the mouse. As in the case of the high frequency change area, the position of the copy area is defined by the coordinates of the upper left top point and the size of the copy area is defined by the width w and height h of the high frequency change area.

FIG. 8 is a diagram illustrating a method of calculating the position of the copy area. The area of "i=0" is a copy area obtained by executing a copy event at Time T0 and has the same attribute information as that of the high frequency change area when the copy event is generated, i.e., has the upper left coordinates (x0,y0) and the width w and height h of the high frequency change area. The area of "i=1" in FIG. 8 is a copy area obtained by executing a copy event at Time t1. The area of "i=2" in FIG. 8 is a copy area obtained by executing a copy event at Time t2.

For example, the position of the copy area at Time t1 in FIG. 8 is calculated as the coordinates (x1,y1) of the upper left top point by adding the amount of movement of the mouse acquired at Time t1 to the coordinates (x0,y0) of the copy area at Time t0. For example, the position of the copy area at time t2 in FIG. 8 is calculated as the coordinates (x2,y2) of the upper left top point by adding the amount of movement of the mouse acquired at Time t2 to the coordinates (x1,y1) of the copy area at Time t1. Regarding the width and height of the copy area, the width w and height h of the high frequency change area are followed for the copy area of each update count.

As described above, after the attribute information on the copy areas is calculated, the copy event controller 14k outputs the attribute information on the copy areas to the attribute information transmitter 14h. The attribute information transmitter 14h outputs the attribute information on the copy area to the client terminal 20.

The copy event controller 14k outputs the attribute information on the copy areas to the encoder 14e. Out of the bitmap image drawn on the frame buffer 13, an image whose position and size correspond to those of the copy areas are sequentially encoded by the encoder 14e. The encoded image is then transmitted by the second image transmitter 14g to the client terminal 20.

The whole screen moving image conversion determination unit 14m is a processor that determines whether to convert the whole screen, which is drawn on the frame buffer 13, to a moving image. When a copy event is generated, the whole screen moving image conversion determination unit 14m calculates a movement area At and an update frequency Ct by using a whole screen moving image conversion determination map that is mapped in the work internal memory. The movement area At is an area that is updated by accumulating changes between frames of the image. The update frequency Ct is the frequency of change between the frames of the image. If no event has been generated, because the window has not moved and thus the processing load of the server device 10 it not likely to be large, determination of whether to convert the whole image to a moving image is not made. In this case, the whole screen moving image conversion determination map is cleared.

Figure 9:
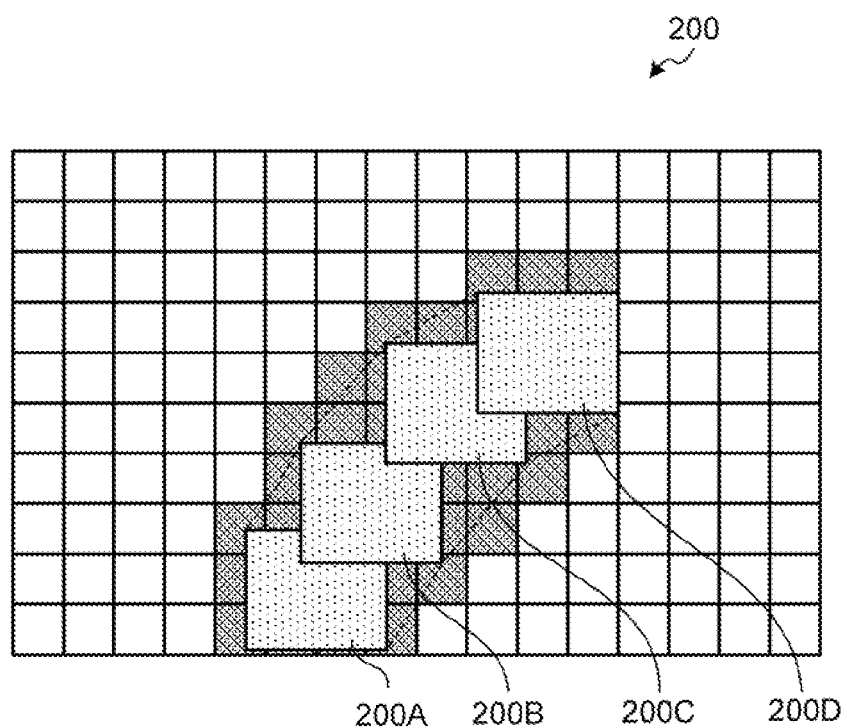
FIG. 9 is a diagram of the mode in which the window moves.

FIG. 9 is a diagram of a mode in which the window moves. The reference numeral 200 in FIG. 9 denotes a whole screen moving image conversion determination map. The reference numeral 200A in FIG. 9 denotes a position of the window at Time t0. The reference numeral 200B in FIG. 9 denotes the position of the window at Time t1. The reference numeral 200C in FIG. 9 denotes the position of the window at Time t2. The reference numeral 200D in FIG. 9 denotes the position of the window at Time t3.

Figure 10A:
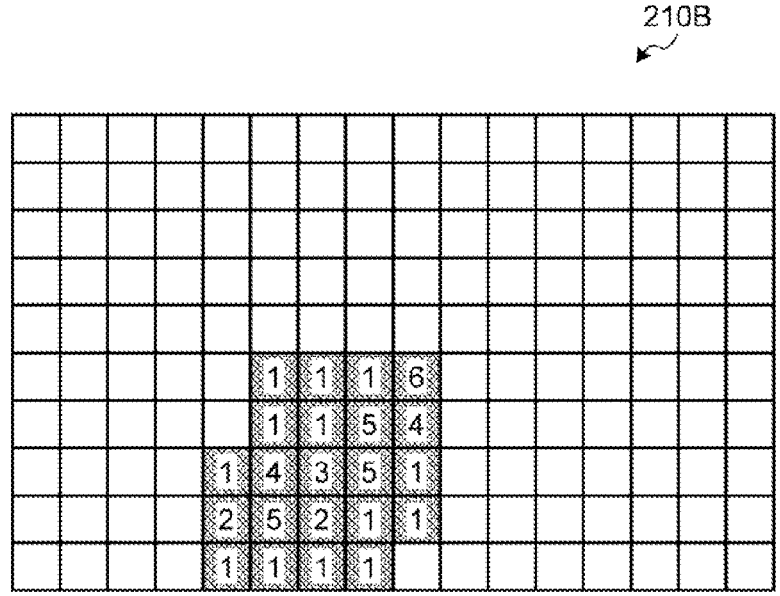
FIG. 10A is a diagram illustrating the update frequency and a movement area.
Figure 10B:
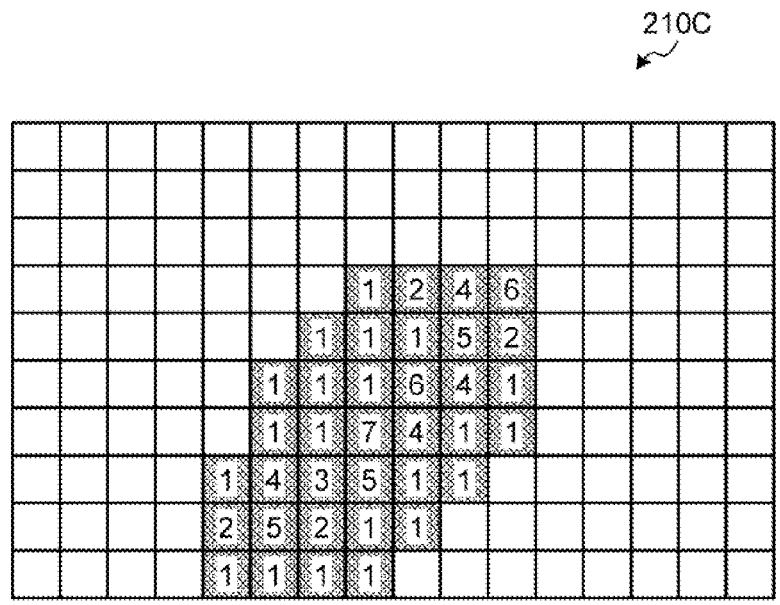
FIG. 10B is a diagram illustrating the update frequency and the movement area.
Figure 10C:
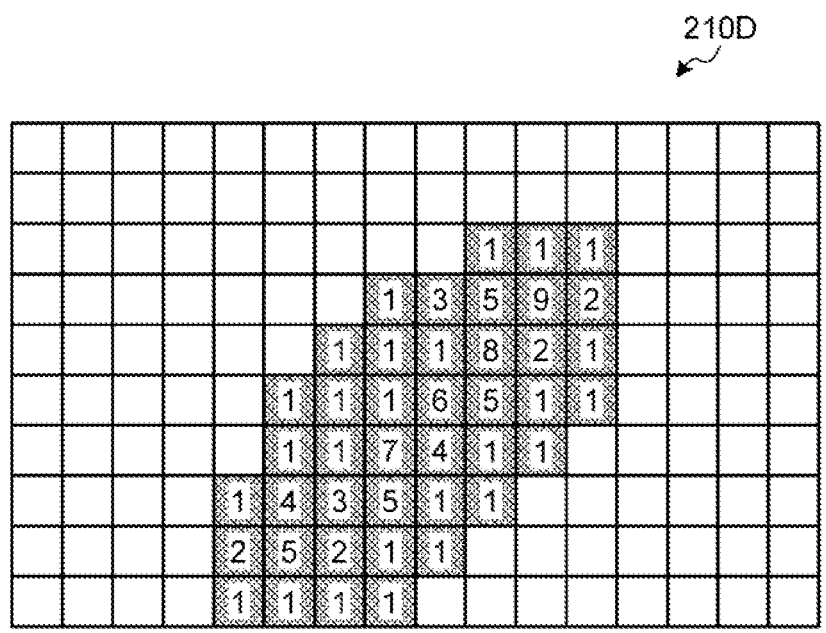
FIG. 10C is a diagram illustrating the update frequency and the movement area.

FIGS. 10A to 10C are diagrams illustrating the update frequency and the movement area. The reference numeral 210B, 210C and 210D in FIGS. 10A, 10B, and 10C denote whole screen moving image conversion determination maps. The shaded parts represent meshes in which an update rectangle is detected even once since a copy event was generated, and the total of all the meshes corresponds to a movement area At. The numbers in the meshes of the whole screen moving image conversion determination maps 210B, 210C, and 210D each represent the update frequency in the mesh, and the total of the numbers of the all the meshes corresponds to the update frequency Ct.

The example in FIG. 10A represents the whole screen moving image conversion determination map 210B when the window in FIG. 9 is at Time t1. In the example in FIG. 10A, the whole screen moving image conversion determination unit 14m calculates the movement area At of "22" by adding up the meshes of the shaded part and calculates the update frequency Ct to be "49" by adding up the numbers in the meshes.

The example in FIG. 10B represents the whole screen moving image conversion determination map 210C when the window in FIG. 9 is at Time t2. In the example in FIG. 10B, the whole screen moving image conversion determination unit 14m calculates the movement area At to be "36" by adding up the meshes of the shaded part and calculates the update frequency Ct to be "82" by adding up the numbers in the meshes.

The example in FIG. 10C represents the whole screen moving image conversion determination map 210D when the windows in FIG. 9 is at Time t3. In the example in FIG. 10C, the whole screen moving image conversion determination unit 14m calculates the movement area At to be "42" by adding up the meshes of the shaded part and calculates the update frequency Ct to be "98" by adding up the numbers in the meshes.

Accordingly, after calculating the movement area At and the update frequency Ct, the whole screen moving image conversion determination unit 14m determines whether the update frequency Ct is less then a threshold C. When the update frequency Ct is less than the threshold C, the whole screen moving image conversion determination unit 14m further determines whether the movement area At is less than a threshold A2. In contrast, when the update frequency Ct is equal to or more than a threshold C, the whole screen moving image conversion determination unit 14m further determines whether the movement area At is less than the threshold A1.

The reasons for comparing the movement area At with the threshold A2 when the update frequency Ct is less than the threshold C and for changing the threshold to the threshold A1, which is less than the threshold A2, when the update frequency Ct is equal to or more than the threshold C are to minimize the load of the server device 10 by using a determination logic that the whole screen is converted to a moving image when the window containing a moving image has a certain amount of movement and that the whole screen is not converted to a moving image when a window that is a still image has a small amount of movement.

It is preferable that the threshold C to be compared with the update frequency Ct be a value that can be used to determine whether the window in FIG. 9 contains a moving image. It is also preferable that the threshold A1 to be compared with the movement area At be a value such that movement of the window that contains a moving image exceeds the processing load of the server device 10 when converting the whole screen to a moving image. It is also preferable that the threshold A2 to be compared with the movement area At be a value such that movement of the window that is a still image exceeds the processing load of the server device 10 when converting the whole screen to a moving image. The threshold A1 and the threshold A2 satisfy A1<A2.

If it is presumed that the threshold C is "50", the threshold A1 is "30", and the threshold A2 is "50". In the example in FIG. 10A, because the update frequency Ct is "49", the update frequency Ct<the threshold C is satisfied. Because the movement area At is "22", the movement area At<the threshold A2 is satisfied. Thus, moving image conversion is not performed for the window in FIG. 9 at Time t1. In the example in FIG. 10B, because the update frequency Ct is "82", the update frequency Ct≥the threshold C is satisfied. Because the movement area At is "36", the movement area At≥the threshold A1 is satisfied. Thus, it is determined that the whole screen is to be converted to a moving image for the window in FIG. 9 at Time t2. Because the whole screen is converted to a moving image for the window at Time t2 in FIG. 9, the update frequency Ct of "98" and the moving area At of "42" at Time t3 are not actually calculated and no determination is made of whether it is necessary to convert the whole screen to a moving image (whole screen moving image conversion).

When the movement area At is equal to or more than the threshold A1, or when the movement area At is equal to or more than the threshold A2, the whole screen moving image conversion determination unit 14m determines that the whole screen is to be converted to a moving image. In this case, the whole screen moving image conversion determination unit 14m instructs the encoder 14e to perform encoding for the whole screen drawn on the frame buffer 13. The whole bitmap image drawn on the frame buffer 13 is sequentially encoded by the encoder 14e. The encoded image is then transmitted by the second image transmitter 14g to the client terminal 20. When no specific mouse event is detected anymore, i.e., when the window move ends, the conversion of the whole screen to a moving image is returned to the original mode in which an update rectangle is transmitted.

The high frequency screen update area identifier 14n is a processor that identifies, from the whole screen moving image area, an update area that actually changes during the whole screen moving image conversion. For example, the high frequency screen update area identifier 14n calculates attribute information on the update area that has changed since the previous copy until the present copy according to the position and size of the copy area, which is obtained by executing the previous copy event, and the copy area, which is obtained by executing the current copy event. It is assumed that the update area that has changed from the previous time to the current time is represented as a rectangle.

Figure 11A:
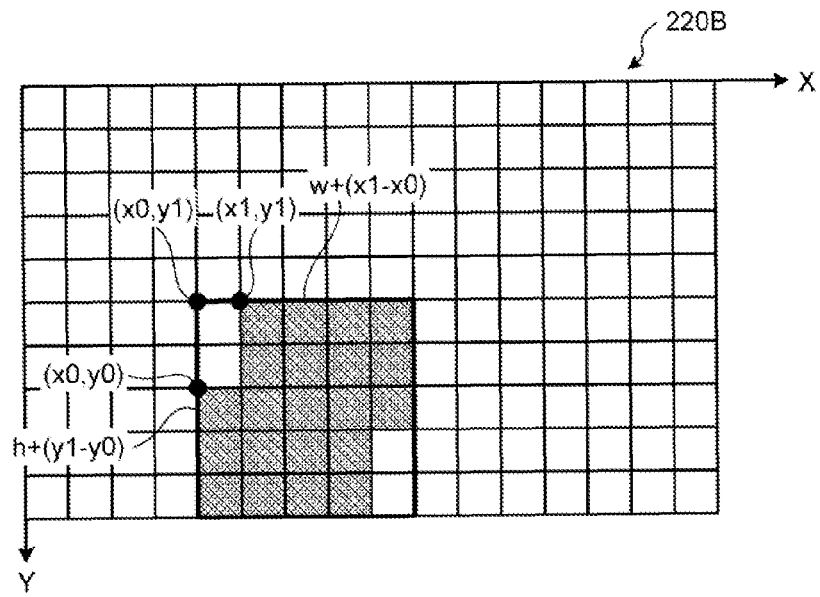
FIG. 11A is a diagram illustrating the calculation of attribute information on update areas.
Figure 11B:
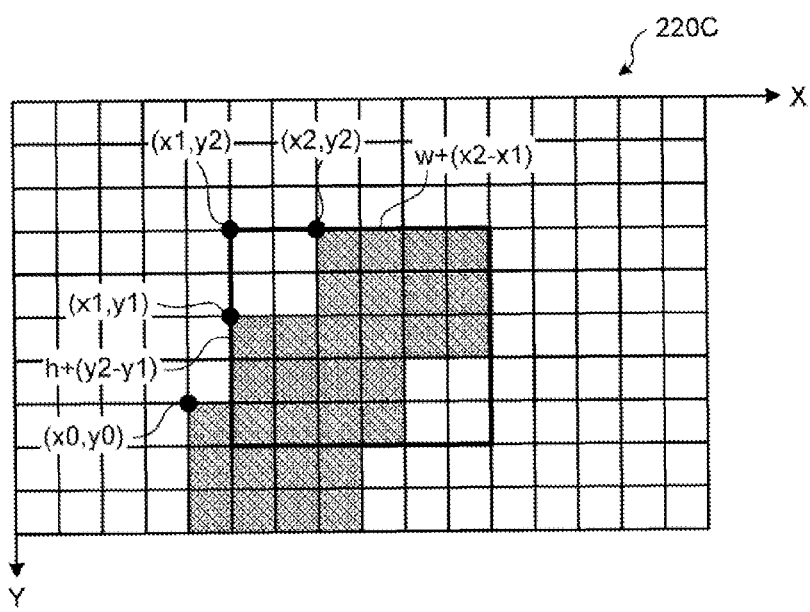
FIG. 11B is a diagram illustrating the calculation of attribute information on update areas.

FIGS. 11A and 11B are diagrams illustrating the calculation of attribute information of an update area. The reference numerals 220B and 220C in FIGS. 11A and 11B denote whole screen moving image conversion determination maps. The shaded part in FIG. 11A represents a copy area obtained by executing a copy event at Time t2 and a copy area obtained by executing a copy event at Time t3. The shaded part in FIG. 11B represents the copy area obtained by executing a copy event at Time t2, the copy area obtained by executing a copy event at Time t3, and a copy area obtained by executing a copy event at Time t4.

In the example in FIG. 11A, the whole screen moving image conversion determination map 220B when the window is at Time t3 is represented. In the example in FIG. 11A, the high frequency screen update area identifier 14n calculates the attribute information on the update area that has changed from Time t2 to Time t3 according to the position and size of the copy area obtained by executing the copy event at time t2 and the position and size of the copy area obtained by executing the copy event at time t3. Here, the copy area at Time t2 has the coordinates (x0,y0) of the upper left top point, a width w, and a height h. The copy area at Time t3 has the coordinates (x1,y1) of the upper left top point. The high frequency screen update area identifier 14n calculates the update area that has changed between the previous time t2 and the current Time t3. The calculation is done by using the coordinates (x0,y1) of the upper left coordinates, the width "w+(x1−x0)", and the height "h+(y1−y0)".

The example in FIG. 11B represents the whole screen moving image conversion determination map 220C obtained when the window is at Time t4. In the example in FIG. 11B, the high frequency screen update area identifier 14n calculates the attribute information on the update area that has changed between Time t3 to Time t4 according to the position and size of the copy area obtained by executing the copy event at time t3 and the position and size of the copy area obtained by executing the copy event at time t4. Here, the copy area at Time t3 has the coordinates (x1,y1) of the upper left top point. The size of the copy area at time t3 is the same as the size of the copy area at time t2. The copy area at Time t4 has the coordinates (x2,y2) of the upper left top point. The high frequency screen update area identifier 14n calculates the update area that has changed between the previous time t3 and the current Time t4, using the coordinates (x1,y2) of the upper left coordinates, the width "w+(x2−x1)", and the height "h+(y2−y1)".

During the whole screen moving image conversion, each time an update area is calculated, the high frequency screen update area identifier 14n calculates an accumulated update area by accumulating update areas. Here, "during the whole screen moving image conversion" denotes the period after a copy event for which the whole screen moving image conversion is started is generated and until no copy event for which whole screen moving image conversion is ended is generated. For example, during the whole screen moving image conversion, while a copy event is generated, the high frequency screen update area identifier 14n accumulates the update areas each calculated each time a copy event is generated and then calculates attribute information of the accumulated update area. The accumulate update area is represented as a rectangle.

Figure 12A:
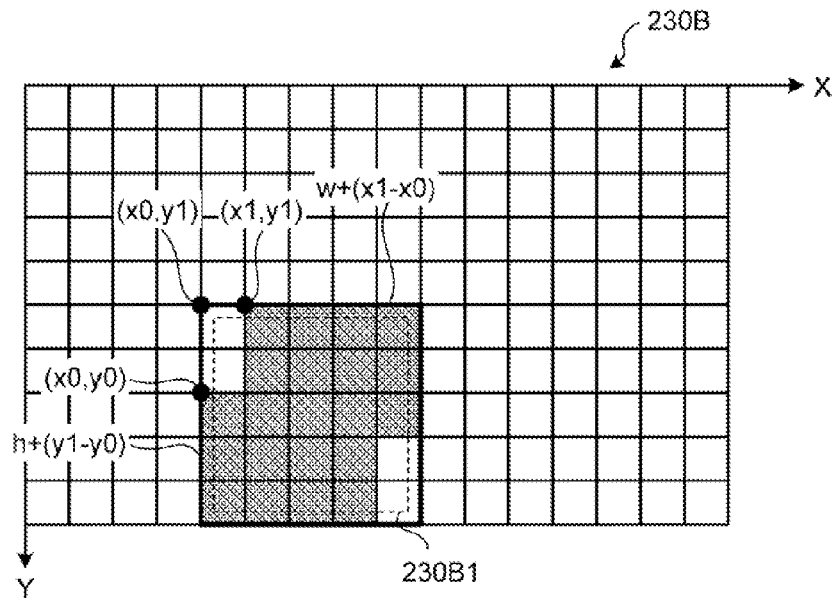
FIG. 12A is a diagram illustrating the calculation of attribute information on an accumulated update area.
Figure 12B:
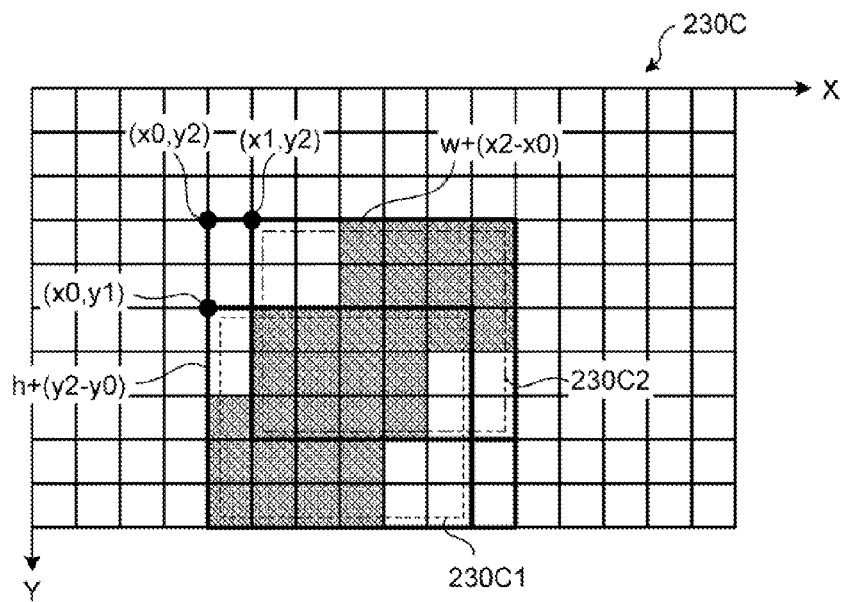
FIG. 12B is a diagram illustrating the calculation of attribute information on an accumulated update area.

FIGS. 12A and 12B are diagrams illustrating the calculation of attribute information on an accumulated update area. The reference numerals 230B and 230C in FIGS. 12A and 12B denote whole screen moving image conversion determination maps. The shaded part in FIG. 12A represents a copy area obtained by executing a copy event at Time t2 and a copy area obtained by executing a copy event at Time t3. The reference numeral 230B1 in FIG. 12A denotes an update area between Time t2 and Time t3. The shaded part in FIG. 12B represents the copy area obtained by executing a copy event at Time t2, the copy area obtained by executing a copy event at Time t3, and a copy area that is obtained by executing a copy event at Time t4. The reference numeral 230C1 in FIG. 12B denotes an update area between Time t2 and Time t3. The reference numeral 230C2 in FIG. 12B denotes an update area between Time t3 and Time t4. Here, it is assumed that a copy event for which the whole screen moving image conversion is started is generated at Time t2.

In the example in FIG. 12A, the whole screen moving image conversion determination map 230B for the window at Time t3 is represented. In the example in FIG. 12A, because the copy event for which whole screen moving image conversion is started is generated first at Time t2, the high frequency screen update area identifier 14n regards, as an accumulated update area, the update area 230B1, which is calculated at Time t3 at which the copy event is generated after Time t2. The accumulated update area coincides with the update area between Time t2 and Time t3 and is calculated so that the coordinates (x0,y1) of the upper left top point, the width "w+(x1−x0)", and the height "h+(y1−y0)" are obtained.

In the example in FIG. 12B, the whole screen moving image conversion determination map 230C when the window is at Time t2 is represented. In the example in FIG. 12B, the high frequency screen update area identifier 14n accumulates the update area 230C1 calculated at Time t3 and the update area 230C2 calculated at Time t4 to obtain an accumulated update area. Here, the accumulated update area is calculated so that the coordinates (x0,y2) of the upper left coordinates, the width "w+(x2−x0)", and the height "h+(y2−y0)" are obtained.

During the whole screen moving image conversion, the screen update notifier 14o gives notice of the attribute information on the update areas to the second image transmitter 14g. The second image transmitter 14g then transmits, to the client terminal 20, the moving image of the whole screen, which is encoded by the encoder 14e, and the attribute information on the update areas that is given as notice by the screen update notifier 14o.

When the whole screen moving image conversion ends, the screen update notifier 14o notifies the first image transmitter 14f of the image of and attribute information on the update rectangle of the accumulated update area. For example, when the copy event controller 14k notifies the screen update notifier 14o of ending of a copy event, the screen update notifier 14o determines that the whole screen moving image conversion is to be ended and notifies the first image transmitter 14f of the image of and attribute information on the update rectangle of the accumulated update area that is generated by the screen generator 14b. The first image transmitter 14f then transmits, to the client terminal 20, the image of the update rectangle of the accumulated update area.

Various integrated circuits and electric circuits can be used for the OS execution controller 11a, the APP execution controller 11b, the graphic driver 12, and the server remote screen controller 14. Furthermore, a part of the functional units included in the server remote screen controller 14 can be other integrated circuits and electric circuits. For example, an application specific integrated circuit (ASIC) and a field programmable gate array (FPGA) can be used as integrated circuits. Furthermore, a central processing unit (CPU) and a micro processing unit (MPU) can be used as electric circuits.

Configuration of Client Terminal

A configuration of the client terminal according to the embodiment will be described. As depicted in FIG. 1, the client terminal 20 includes an input unit 21, the display unit 22, and a client remote screen controller 23. In the example in FIG. 1, the client terminal 20 includes, in addition to the functional units in FIG. 1, various functional units of conventional computers, such as a function of an audio output unit.

The input unit 21 is an input device that accepts various types of information, such as the input of an instruction to the client remote screen controller 23 described below. For example, a keyboard and a mouse can be used. The display unit 22 described below also has a pointing device function in conjunction with the mouse.

The display unit 22 is a display device that displays, for example, a desktop screen that is transmitted from the server device 10. For example, a monitor, a display, or a touch panel can be used.

The client remote screen controller 23 is a processor that receives provision of the remote screen control services of the server device 10 via the client remote screen control APP. The client remote screen controller 23 includes, as depicted in FIG. 1, a first image receiver 23b, a first display controller 23c, a second image receiver 23d, a decoder 23e, and a second display controller 23f.

An operation information notifier 23a is a processor that notifies the server device 10 of operation information from the input unit 21. For example, the operation information notifier 23a gives, as operation information, notice of left and right click, double click, and drag of the mouse and the position and amount of movement of the mouse cursor, which are obtained via a mouse moving operation. For a further example, the operation information notifier 23a gives, as operation information, notice of the amount of rotation of the mouse wheel or a key pushed on the keyboard.

The first image receiver 23b is a processor that receives an image of and attribute information on an update rectangle that is transmitted from the first image transmitter 14f of the server device 10. The first image receiver 23b receives the attribute information of a high frequency change area or the attribute information on a copy area.

The first display controller 23c is a processor that displays, on the display unit 22, the image of the rectangle, which is the image received by the first image receiver 23b. In an example, the first display controller 23c displays a bitmap image of the update rectangle on a screen area of the display unit 22 corresponding to the position and size contained in the attribute information on the update rectangle, which is received by the first image receiver 23b.

For a further example, when the first image receiver 23b receives the attribute information on a high frequency change area or the attribute information on a copy area, the first display controller 23c performs the following process. The first display controller 23c sets, as a blank area on which the bitmap image is not displayed, the screen area of the display unit 22 corresponding to the position and size contained in the attribute information on the high frequency change area or the attribute information on the copy area.

In a further example, when the first display controller 23c receives the attribute information on an accumulated update area, the first display controller 23c performs the following process. When the whole screen moving image conversion ends, the first display controller 23c displays a bitmap image of an update rectangle in the screen area of the display unit 22 corresponding to the position and size contained in the attribute information on the accumulated update area.

The second image receiver 23d is a processor that receives the encoded image of the high frequency change area or the encoded image of the copy area, which is the encoded image transmitted by the second image transmitter 14g of the server device 10. The second image receiver 23d receives the encoded image of the whole screen and the attribute information on the update area that has actually changed in the whole screen, which are the image and information transmitted by the second image transmitter 14g of the server device 10.

The decoder 23e is a processor that decodes the encoded image of the high frequency change area, the copy area, or the whole screen, which is the encoded image received by the second image receiver 23d. A decoder of a decoding system corresponding to the encoding system, which is installed in the server device 10, is installed in the decoder 23e.

The second display controller 23f is a processor that displays the decoded image, which is decoded by the decoder 23e, directly on the display unit 22.

For example, if the decoded image that is input from the decoder 23e is the decoded image of the high frequency change area, the second display controller 23f displays, on the screen area of the display unit 22, the decoded image that is displayed as a blank area by the first display controller 23c.

For a further example, if the decoded image that is input from the decoder 23e is the decoded image of the copy area, the second display controller 23f displays, on the screen area of the display unit 22, the decoded image that is displayed as a blank area by the first display controller 23c.

In a further example, if the decoded image that is input from the decoder 23e is the decoded image of the whole screen, the second display controller 23f displays the decoded image of the whole screen on the display unit 22.

A third display controller 23g is a processor that displays the decoded image, which is decoded by the decoder 23e, in association with the attribute information. For example, when the decoded image, which is input from the decoder 23e, does not coincide with the size according to the attribute information, the third display controller 23g determines that the whole screen is being converted to a moving image. The third display controller 23g then cuts out a part of the decoded image, which is the part corresponding to the position and size according to the attribute information on the update area that has actually changed, from the decoded image of the whole screen.

Process Flow

Figure 13:
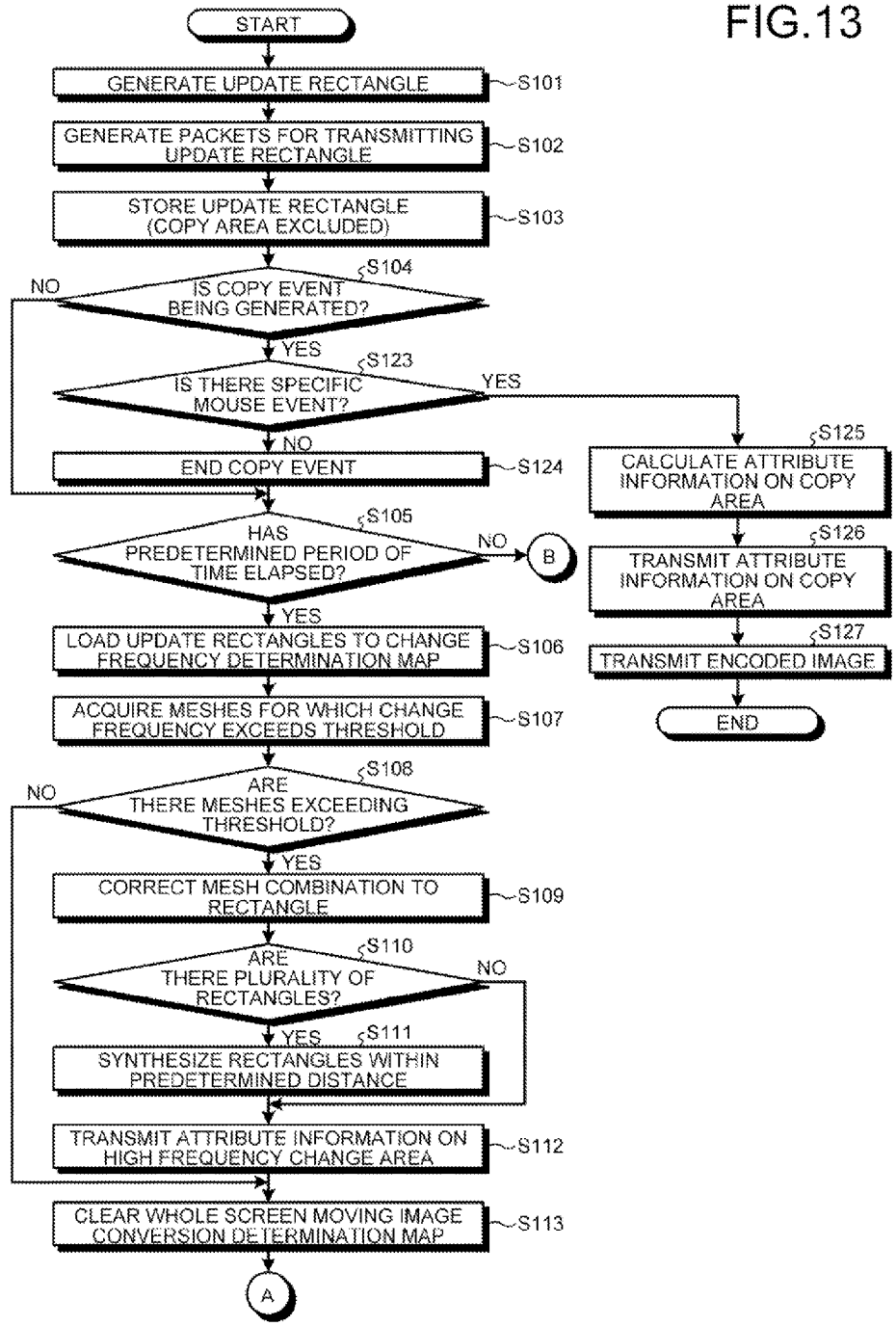
FIG. 13 is a flowchart of a procedure of an image transmission process according to the embodiment.
Figure 14:
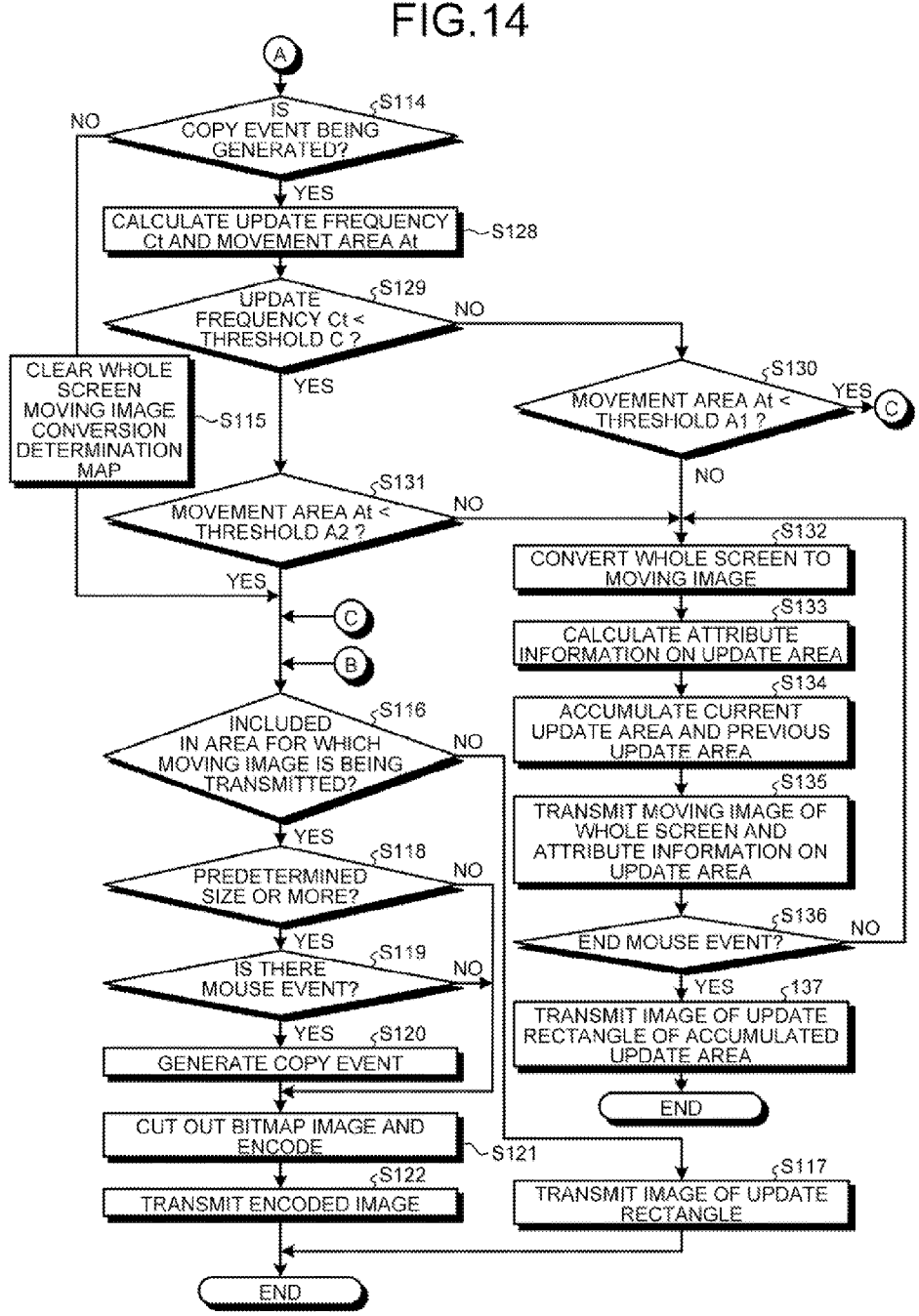
FIG. 14 is a flowchart of the procedure of the image transmission process according to the embodiment.

The process flow of the thin client system according to the embodiment will be described. FIGS. 13 and 14 are flowcharts of the procedure of an image transmission process according to the embodiment. The image transmission process is a process that is executed by the server device 10 and is started when bitmap data is drawn on the frame buffer 13.

As depicted in FIG. 13, when bitmap data is drawn on the frame buffer 13, the screen generator 14b generates an image of an update rectangle that is obtained by connecting pixels of a part that has changed from the previous frame and by forming the part into a rectangle (step S101). According to the previously-generated image of the update rectangle, the screen generator 14b then generates packets for transmitting the update rectangle (step S102).

The change frequency determination unit 14c stores the update rectangle, which is generated by the screen generator 14b, in the work internal memory (not depicted) (step S103). No update rectangle of a copy area is stored in the work internal memory in order to reduce the volume of a process related to identifying of a high frequency change area.

When the update rectangle is not included in an area for which a copy event is being generated (NO at step S104), the change frequency determination unit 14c determines whether a predetermined period of time has elapsed since storing of update rectangles was started (step S105).

When the predetermined period of time has not elapsed yet since storing of update rectangles was started (NO at step S105), the following process related to identifying of a high frequency change area is skipped and the procedure goes to step S116.

When the predetermined period of time has elapsed since storing of update rectangles was started (YES at step S105), the change frequency determination unit 14c performs the following process. According to the position and size of the update rectangles that are stored in the work internal memory, the change frequency determination unit 14c sequentially loads images of update rectangles to the map for determining the change frequency (step S106). The change frequency determination unit 14c acquires, from the meshes contained in the map for determining the change frequency, meshes for which the change frequency exceeds a threshold (step S107).

The high frequency change area identifier 14d then determines whether the change frequency determination unit 14c has acquired meshes for which the change frequency exceeds the threshold (step S108). When there is no mesh for which the change frequency exceeds a threshold (NO at step S108), there is no high frequency change area on the desktop screen. Thus, the following process related to identifying of a high frequency change area is skipped and the procedure goes to step S113.

In contrast, when there are meshes for which the change frequency exceeds the threshold (YES at step S108), the high frequency change area identifier 14d corrects a mesh combination, which is obtained by combining adjacent meshes, to a rectangle (step S109).

The high frequency change area identifier 14d then determines whether there are a plurality of corrected rectangles, i.e., a plurality of high frequency change area candidates (step S110). When there are a plurality of corrected rectangles, i.e., a plurality of high frequency change area candidates (YES at step S110), the high frequency change area identifier 14d performs the following process. The high frequency change area identifier 14d synthesizes a rectangle that contains the high frequency change area candidates between which the distance is equal to or less than a predetermined value (step S111). When there are not a plurality of high frequency change area candidates (NO at step S110), no rectangle is synthesized and the procedure goes to step S112.

The high frequency change area identifier 14d transmits attribute information with which the position and size of the high frequency change area can be specified (step S112). For the meshes mapped in the work internal memory, after incrementing the number of times each of the meshes has changed in a whole screen moving image conversion determination map, the high frequency change area identifier 14d clears the whole screen moving image conversion determination map (step S113).

When no copy event is generated by the copy event controller 14k (NO at step S114), the whole screen moving image conversion determination unit 14m clears the whole screen moving image conversion determination map (step S115).

The high frequency change area identifier 14d then determines whether the update rectangle, which is generated by the screen generator 14b, is included in the high frequency change area stored in the work internal memory, i.e., is included in the area for which a moving image is being transmitted by the second image transmitter 14g (step S116).

When the update rectangle is not included in the high frequency change area (NO at step S116), the first image transmitter 14f transmits the image of and attribute information on the update rectangle to the client terminal (step S117) and the process ends.

In contrast, when the update rectangle is included in the high frequency change area (YES at step S116), the copy event controller 14k determines whether the high frequency change area is in a predetermined size or more (step S118). When the high frequency change area is in a size less than the predetermined size (NO at step S118), no copy event is generated and the procedure goes to step S121.

When the high frequency change area is in the predetermined size or more (YES at step S118), the copy event controller 14k further determines whether a specific mouse event is detected (step S119). When the specific mouse event is not detected (NO at step S119), no copy event is generated and the procedure goes to step S121.

When the specific mouse event is detected (YES at step S119), the copy event controller 14k generates a copy event (step S120). The high frequency change area identifier 14d cuts out, from the bitmap data drawn on the frame buffer 13, a bitmap image of a part corresponding to the high frequency change area and then causes the encoder 14e to encode the bitmap image (step S121). The encoded image of the high frequency change area, which is encoded by the encoder 14e, is transmitted to the client terminal (step S122) and the process ends.

Now back to the determination at step S104, when the update rectangle is included in an area for which a copy event is being generated (YES at step S104), the copy event controller 14k determines whether a specific mouse event is detected (step S123).

When the specific mouse event is not detected (NO at step S123), the copy event controller 14k ends the copy event (step S124) and goes to step S105.

In contrast, when the specific mouse event is detected (YES at step S123), the copy event controller 14k performs the next process. In other words, according to the position of the previous copy area before execution of the current copy event and the currently-acquired amount of movement of the mouse, the copy event controller 14k calculates the position of the copy area that is obtained by currently executing a copy event (step S125).

The attribute information transmitter 14h transmits attribute information on the copy area to the client terminal 20 (step S126). The second image transmitter 14g transmits, to the client terminal 20, an encoded image that is obtained by encoding the copy area (step S127) and ends the process.

Now back to the determination at step S114, when a copy event is generated (YES at step S114), the whole screen moving image conversion determination unit 14m calculates a movement area At and an update frequency Ct (step S128). The whole screen moving image conversion determination unit 14m determines whether the update frequency Ct is less than a threshold C (step S129).

When the update frequency Ct is equal to or more than the threshold C (NO at step S129), the whole screen moving image conversion determination unit 14m further determines whether the movement area At is less than the threshold A1 (step S130). When the movement area At is less than the threshold A1 (YES at step S130), the procedure goes to step S116.

When the update frequency Ct is less than the threshold C (YES at step S129), the whole screen moving image conversion determination unit 14m determines whether the movement area At is less than the threshold A2 (step S131). When the movement area At is less than the threshold A2 (YES at step S131), the procedure goes to step S116.

When the movement area At is equal to or more than the threshold A1 or more or when the movement area At is equal to ore more than the threshold A2 (NO at step S130 or NO at step S131), the following process is performed. The whole screen moving image conversion determination unit 14m instructs the encoder 14e to encode the whole screen that is drawn on the frame buffer 13 in order to convert the whole screen to a moving image (step S132).

The high frequency screen update area identifier 14n calculates attribute information on the update area that has changed since the previous copy until the present copy according to the attribute information on the copy area, which is obtained by executing the previous copy event, and the position of the copy area, which is obtained by executing the current copy event (step S133).

The high frequency screen update area identifier 14n accumulates the calculated current update area and the previous update area and calculates attribute information on an accumulated update area (step S134). The second image transmitter 14g transmits, to the client terminal 20, the moving image that is obtained by the encoder 14e by encoding the whole screen and the attribute information on the update area that is given as notice by the screen update notifier 14o (step S135).

The copy event controller 14k then determines whether to end the mouse event by determining whether the specific mouse event is detected (step S136). When it is determined that the mouse event is not to be ended (NO at step S136), the procedure goes to step S132 to repeat the process for converting the whole screen to a moving image.

When it is determined that the mouse event is to be ended (YES at step S136), the first image transmitter 14f transmits, to the client terminal 20, an image of the update rectangle of the accumulated update area drawn on the frame buffer 13 (step S137). Accordingly, the process for converting the whole screen to a moving image from step S132 to step S137 is ended to return to the original mode in which an update rectangle is transmitted.

The process related to identifying of a high frequency change area from step A105 to step S113 can be run as a process independent of the flow in FIGS. 13 and 14. In such a case, the process starts each time the predetermined period of time has elapsed since storing of update rectangles was started.

The process from step S116 to step S117 can be run as a process independent of the flow in FIGS. 13 and 14. In such a case, the process starts each time the screen generator 14b generates an update rectangle.

The process from step S123 to step S124 can be run as a process independent of the flow in FIGS. 13 and 14. In such a case, each time bitmap data is drawn on the frame buffer 13, it is determined whether attribute information on a high frequency change area is registered. When the attribute information on the high frequency change area is registered, the process starts.

Figure 15:
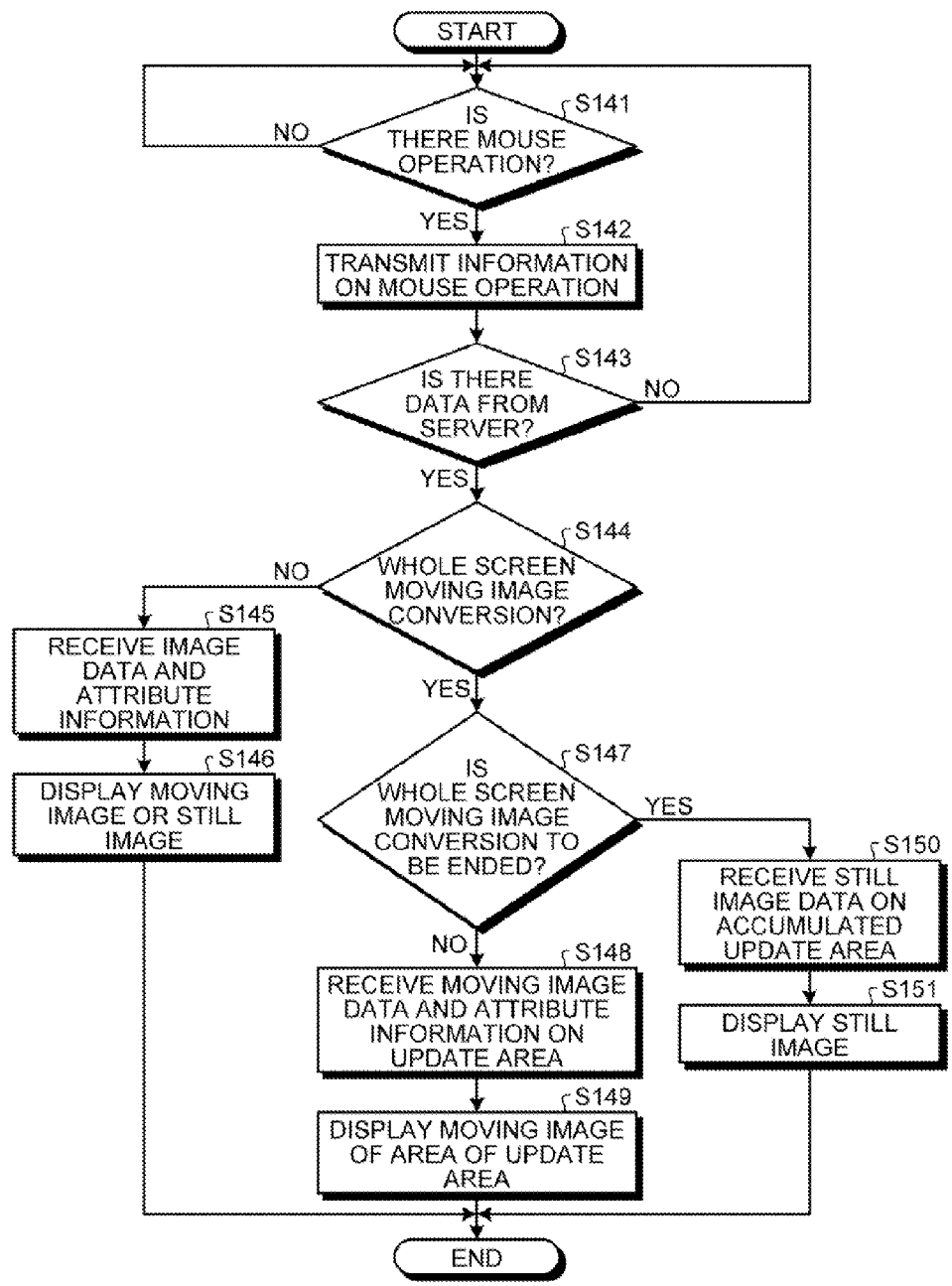
FIG. 15 is a flowchart of the procedure of an image display process according to an embodiment.

FIG. 15 is a flowchart of a procedure of an image display process according to the embodiment. The image display process is a process executed by the client terminal 20.

As depicted in FIG. 15, the operation information notifier 23a determines whether there is a mouse operation (step S141). When there is no mouse operation (NO at step S141), the procedure goes to step S141 until there is a mouse operation. In contrast, when there is a mouse operation (YES at step S141), the operation information notifier 23a transmits information on the mouse operation to the server device 10 (step S142).

The first image receiver 23b and the second image receiver 23d determine whether there is data from the server device 10 (step S143). When there is no data from the server device 10 (NO at step S143), the first image receiver 23b and the second image receiver 23d goes to step S141 until it is determined that there is data from the server device 10.

When there is data from the server device 10 (YES at step S143) and the data is not a moving image converted from the whole screen (NO at step S144), the first image receiver 23b and/or the second image receiver 23d receive image data and attribute information (step S145). In other words, the second image receiver 23d receives moving image (encoded) data and attribute information on a high frequency change area or a copy area. The first image receiver 23b receives still image (update rectangle) data.

When the second image receiver 23d receives moving image data, the second display controller 23f displays the moving image that is decoded by the decoder 23e on the display unit 22. When the first image receiver 23b receives still image data, the first display controller 23c displays the still image data, which is received by the first image receiver 23b, on the display unit 22 (step S146).

Now back to the determination at step S144, when the data is a moving image converted from the whole screen (YES at step S144), until the whole screen moving image conversion ends (NO at step S147), the second image receiver 23d receives the data of a moving image converted from the whole screen and the attribute information on the update area (step S148).

The third display controller 23g cuts out, from the moving image of the whole screen decoded by the decoder 23e, a part corresponding to the attribute information on the update area and then displays the image on the display unit 22 (step S149).

When the whole screen moving image conversion ends (YES at step S147), the first image receiver 23b receives the still image (update rectangle) data of the accumulated update area (step S150). The first display controller 23c then displays, on the display unit 22, the still image data on the accumulated update area that is received by the first image receiver 23b (step S151).

Effect of Embodiment

As described above, in the server device 10 according to the embodiment, when the updated area or the update frequency in the screen becomes equal to or more than the threshold due to movement of the window, a moving image obtained by converting the whole screen to a moving image and an update area that has actually changed are transmitted to the client terminal 20. Furthermore, in the server device 10 according to the embodiment, the update areas for which the whole screen moving image conversion is performed are accumulated to calculate an accumulated update area. When conversion of the whole screen to a moving image ends, the update rectangle of the accumulated update area is transmitted to the client terminal. Accordingly, in the server device 10 according to the embodiment, when the whole screen moving image conversion ends, an update rectangle limited to the area that has changed during the whole screen moving image conversion can be transmitted. Thus, an increase in the width of the transmission band can be reduced compared with a case where the update rectangle of the whole screen area is transmitted.

Application Range

In the above-described embodiment, when the conditions on the update frequency and movement area are satisfied, the whole screen is converted to a moving image. However, other conditions may be used. For example, when the area of an area of the whole screen for which the change frequency exceeds the threshold, i.e., the area of a high frequency change area, exceeds a threshold, the whole screen may be converted to a moving image. In such a case, for example, even when no copy event is generated, the whole screen moving image conversion determination unit 14m calculates an area Bt of the high frequency change area by using a whole screen moving image conversion determination map that is mapped on the work internal memory. The whole screen moving image conversion determination unit 14m then determines whether the calculated area Bt of the high frequency change area is equal to or more than a threshold A3. It is preferable that the threshold A3 be a value such that the processing load of the server device 10 when converting an area containing a moving image to a moving image exceeds the processing load of the server device 10 when converting the whole screen to a moving image.

When the calculated area Bt of the high frequency change area is equal to or more than the threshold A3, the whole screen moving image conversion determination unit 14m determines that the whole screen is to be converted to a moving image. During the whole screen moving image conversion, each time the screen generator 14b generates an update rectangle, the high frequency screen update area identifier 14n regards the update rectangle as an update area and calculates attribute information on the update area. Each time an update area is calculated, the high frequency screen update area identifier 14n accumulates the update area to calculate an accumulated update area. The accumulated update area is represented in a rectangle.

During the whole screen moving image conversion, the screen update notifier 14o gives notice of attribute information on the update area. Thereafter, the second image transmitter 14g transmits, to the client terminal 20, a moving image obtained by the encoder 14e by encoding the whole screen and the attribute information on the update area, which is given as notice by the screen update notifier 14o.

When conversion of the whole screen to a moving image ends, the screen update notifier 14o notifies the first image transmitter 14f of the image of and attribute information on the update rectangle of the accumulated update area. For example, the screen update notifier 14o determines whether the update frequency in the high frequency change area is equal to or less than a predetermined amount. It is desirable that the predetermined amount be a value that can be used to determine whether a moving image is included in the high frequency change area. When the update frequency in the high frequency change area is equal to or less than the predetermined amount, the screen update notifier 14o determines that the whole screen moving image conversion is to be ended and notifies the first image transmitter 14f of an image of the update rectangle of the accumulated update area, which is generated by the screen generator 14b, and the attribute information. The first image transmitter 14f then transmits the image of the update rectangle of the accumulated update area to the client terminal 20.

Figure 16:
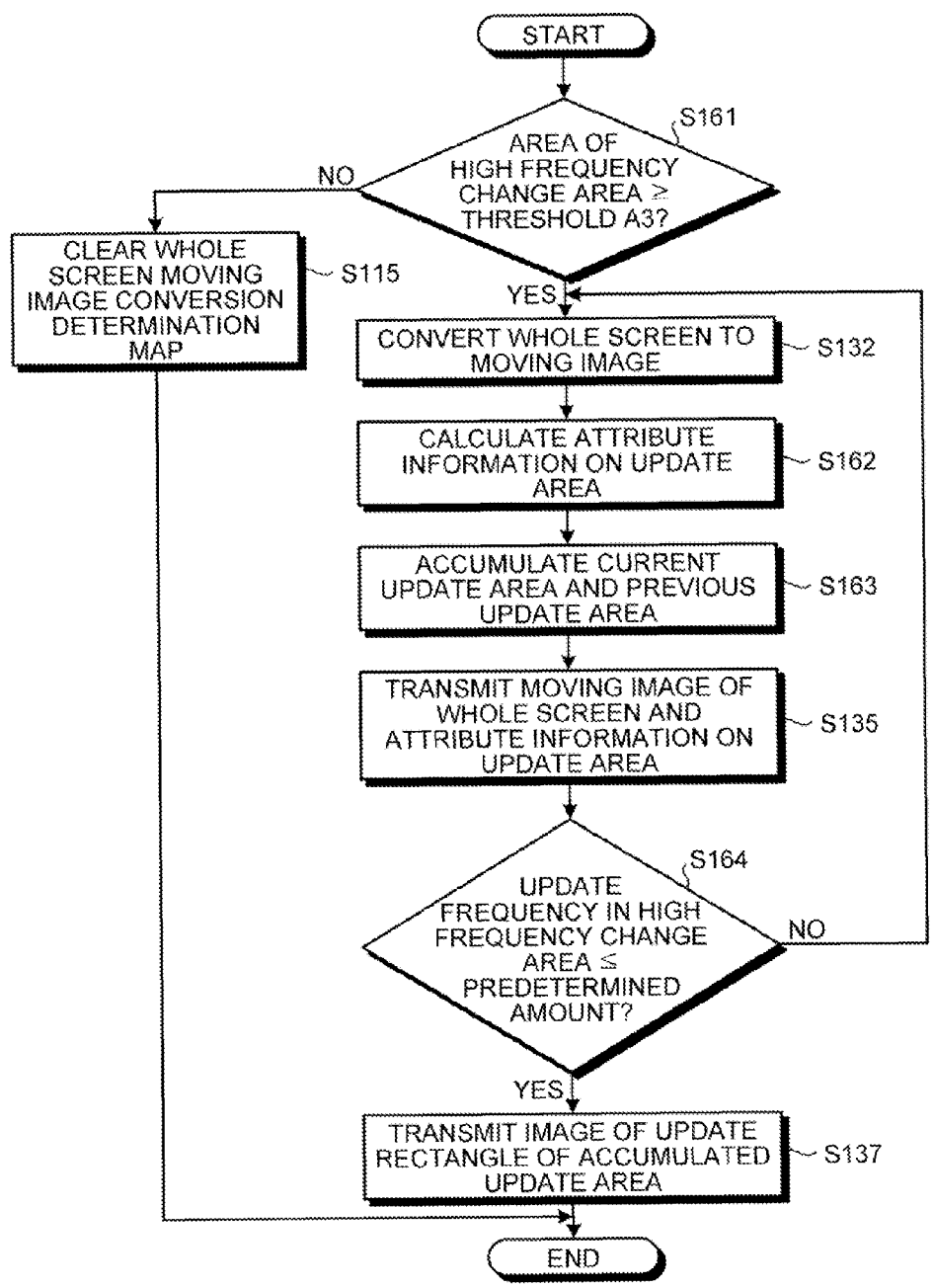
FIG. 16 is a flowchart of a procedure of a modification of the image transmission process according to the embodiment.

Here, the image transmission process in which the whole screen is converted to a moving image even when no copy event is generated will be described with reference to FIG. 16. FIG. 16 is a flowchart of the procedure of a modification of the image transmission process according to the embodiment. FIG. 16 only illustrates the process in the case where no copy event is generated at step S114 in the image transmission process in FIG. 14. Other aspects of the process are the same as those of the process illustrated in FIGS. 13 and 14 and thus the descriptions thereof will be omitted. The same reference numerals denote the same processing as that in the image transmission process in FIG. 14.

When no copy event is generated by the copy event controller 14k (NO at step S114), the whole screen moving image conversion determination unit 14m determines whether the area Bt of the high frequency change area is equal to or more than the threshold A3 (step S161). When the area Bt of the high frequency change area is equal to or more than the threshold A3 (YES at step S161), the following process is performed. In order to convert the whole image to a moving image, the whole screen moving image conversion determination unit 14m instructs the encoder 14e to encode the whole screen drawn on the frame buffer 13 (step S132).

The high frequency screen update area identifier 14n regards the area of the update rectangle, which is generated by the screen generator 14b, as an update area and calculates attribute information on the update area (step S162). The high frequency screen update area identifier 14n accumulates the calculated current update area and the previous update area and calculates attribute information on the accumulated update area (step S163).

The second image transmitter 14g transmits, to the client terminal 20, a moving image obtained by the encoder 14e by encoding the whole screen and attribute information on the update area that is given as notice by the screen update notifier 14o (step S135).

Thereafter, the screen update notifier 14o determines whether the update frequency in the high frequency change area is equal to or less than a predetermined amount (step S164). When it is determined that the update frequency in the high frequency change area is more than the predetermined amount (NO at step S164), the procedure goes to step S132 to repeat the process for whole screen moving image conversion.

In contrast, when it is determined that the update frequency in the high frequency change area is equal to or less than the predetermined amount (YES at step S61), the first image transmitter 14f transmits, to the client terminal 20, the image of the update rectangle of the accumulated update area drawn on the frame buffer 13 (step S137). Accordingly, the process for converting the whole screen to a moving image from step S132 to S137 is ended to return to the original mode in which an update rectangle is transmitted.

Other Aspects

In the above-described embodiment, the whole screen is converted to a moving image when the predetermined conditions are satisfied. However, the area to be converted to a moving image is not limited to the whole screen. It is satisfactory if the area is larger than the accumulated update area. Accordingly, when moving image conversion of an area larger than the accumulated update area ends, an update rectangle to be transmitted is limited to the accumulated update area; therefore, an increase in the width of the transmission band can be reduced compared with the case in which an update rectangle of an area converted to a moving image is transmitted.

The elements of each device in the drawings are functional ideas and do not need to be physically configured as illustrated in the drawings. In other words, the specific modes of separation or integration of each device are not limited to those illustrated in the drawings and the devices may be configured in a way that they are entirely or partially separated or integrated functionally or physically on an arbitrary basis in accordance with various loads or how they are used.

For example, the transmission processes executed by the first image transmitter 14f and the second image transmitter 14g of the server device 10 may be integrated to a single image transmitter. Furthermore, the image receiving processes executed by the first image receiver 23b and the second image receiver 23d of the client terminal 20 may be integrated to a single image receiver. Furthermore, display control processes executed by the first display controller 23c and the second display controller 23f of the client terminal 20 may be integrated to a single display controller.

The operation information acquisition unit 14a, the screen generator 14b, the change frequency determination unit 14c, the high frequency change area identifier 14d, the encoder 14e, and the first image transmitter 14f of the server device 10 can be configured as described below. Furthermore, the second image transmitter 14g, the attribute information transmitter 14h, the copy event controller 14k or the whole screen moving image conversion determination unit 14m, and the high frequency screen update area identifier 14n or the screen update notifier 14o of the server device 10 can be configured as described below. For example, these functional units may be connected as external devices of the server device 10 via a network. For a further example, different devices may include these functional units, respectively, and the functional units may be connected via a network so as to cooperate, thereby achieving the functions of the server device 10.

Image Transmission Program

Figure 17:
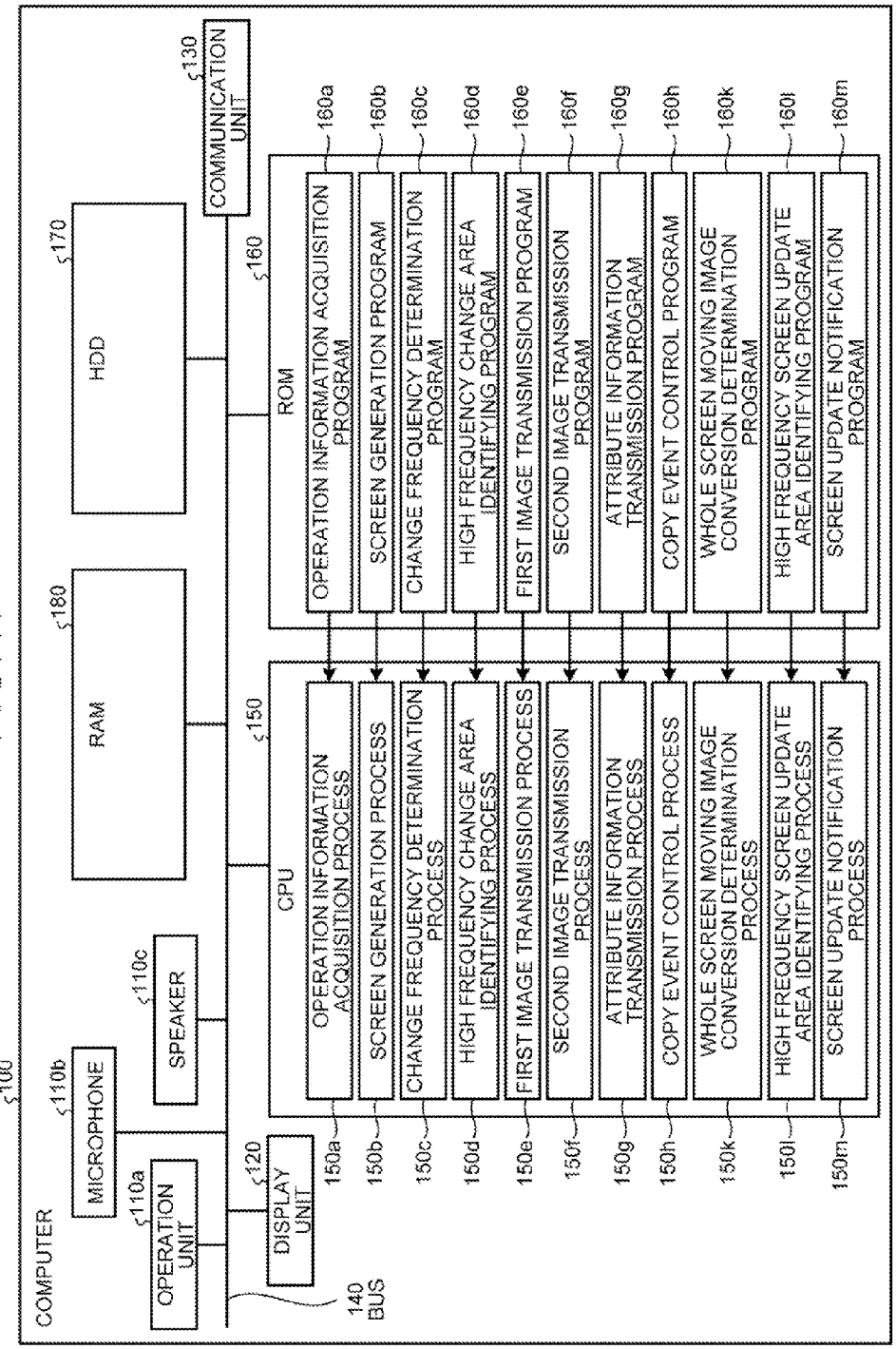
FIG. 17 is a diagram illustrating an example of a computer that executes an image transmission program according to the embodiment.

Various types of processes that are described in the above-described embodiment can be achieved by executing prepared programs using a computer, such as a personal computer or a work station. An example of a computer that executes an image transmission program that achieves the same functions as those of the above-described embodiment will be described using FIG. 17. FIG. 17 is a diagram illustrating an example of the computer that executes the image transmission program according to the embodiment. An example of the computer that executes the image transmission program that achieves the same functions as those of the server device 10 will be described below. Similar description will be given for execution of an image display program that achieves the same functions as those of the client terminal 20.

As depicted in FIG. 17, a computer 100 of an embodiment includes an operation unit 110a, a microphone 110b, a speaker 110c, a display unit 120, and a communication unit 130. The computer 100 further includes a CPU 150, a ROM 160, a hard disk drive (HDD) 170, and a random access memory (RAM) 180. The units 110a to 180 are all connected via a bus 140.

The ROM 160 previously stores a control program for achieving the same functions as those of the operation information acquisition unit 14a, the screen generator 14b, the change frequency determination unit 14c, the high frequency change area identifier 14d, and the first image transmitter 14f. The ROM 160 further stores a control program for achieving the same functions as those of the second image transmitter 14g, the attribute information transmitter 14h, the copy event controller 14k, the whole screen moving image conversion determination unit 14m, the high frequency screen update area identifier 14n, and the screen update notifier 14o. In other words, as depicted in FIG. 16, the ROM 160 stores an operation information acquisition program 160a, a screen generation program 160b, a change frequency determination program 160c, and a high frequency change area identifying program 160d. The ROM 160 further stores a first image transmission program 160e, a second image transmission program 160f, an attribute information transmission program 160g, and a copy event control program 160h. The ROM 160 further stores a whole screen moving image conversion determination program 160k, a high frequency screen update area identifying program 160l, and a screen update notification program 160m. The programs 160a to 160m may be integrated or separated as in the case of the elements of the server device 10 in FIG. 1. It is not necessary to store all the data in the ROM 160. It is satisfactory if only data necessary for the process is stored in the ROM 160.

The CPU 150 reads the programs 160a to 160m from the ROM 160 and executes the programs 160a to 160m. Accordingly, as depicted in FIG. 17, regarding the programs 160a to 160c, the CPU 150 functions as an operation information acquisition process 150a, a screen generation process 150b, and a change frequency determination process 150c. Regarding the programs 160d to 160g, the CPU 150 functions as a high frequency change area identifying process 150d, a first image transmission process 150e, a second image transmission process 150f, and an attribute information transmission process 150g. Regarding the programs 160h to 160m, the CPU 150 functions as a copy event control process 150h, a whole screen moving image conversion determination process 150k, a high frequency screen update area identifying process 150l, and a screen update notification process 150m. The processes 150a to 150m correspond respectively to the units of the server device in FIG. 1. The CPU 150 executes the image transmission program using the RAM 180. Not all the processors virtually achieved on the CPU 150 are required to run on the CPU 150. It is satisfactory if only processors necessary for the process are virtually achieved.

It is not necessary to beforehand store the image transmission program in the HDD 170 or the ROM 160. For example, each program is stored in a "portable physical media" that is a flexible disk, such as an FD, CD-ROM, a DVD disk, a magneto-optical disk, or an IC card. The computer 100 may acquire each program from such a portable physical media and execute each program. Alternatively, each program may be stored in another computer or a server device that is connected to the computer 100 via a public line, the Internet, a LAN, or a WAN and the computer 100 may acquire each program from a computer or a server and execute each program.

According to one aspect of the information processing apparatus disclosed herein, an increase in the width of the transmission band when transmission of moving image data ends can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus that transmits an image to a terminal device that is connected to the information processing apparatus via a network, the information processing apparatus comprising:
an image memory that stores the image;
a first compressor that compresses the image in the image memory in each period of time;
a moving image area detector that detects, from the image stored in the image memory, a moving image area to be compressed by using the first compressor;
a second compressor that compresses the image in the image memory such that image degradation is lower than that of the first compressor;
a change area detector that detects, from an area that is compressed by the first compressor, a change area that has changed;
a calculator that accumulates the change area and calculates an accumulated change area; and
a transmitter that transmits, to the terminal device, a moving image obtained by the first compressor by converting a whole area of the image in the image memory to a moving image and the change area detected by the change area detector and that transmits, when the transmitting of the moving image and the change area ends, an image of the accumulated change area calculated by the calculator, the image of the accumulated change area, which is an update area during the converting the whole area to the moving image, being compressed by the second compressor.

2. The information processing apparatus according to claim 1, wherein the first compressor compresses the moving image area that is a part of the image in the image memory and is detected moving by the moving image area detector.

3. The information processing apparatus according to claim 1, wherein the moving image area detector generates the moving image area by connecting pixels of a part of the image having changed from the image of previous period and by forming the part into a rectangle.

4. The information processing apparatus according to claim 3, wherein
the change area detector determines a frequency of change between moving images regarding each of areas obtained by dividing the image,
the calculator further accumulates the a frequency of change between moving images and identifies a high frequency change area, and
the transmitter transmits the high frequency change area of the moving images obtained by the first compressor.

5. A non-transitory computer readable medium that stores computer program for causing a computer to transmit an image, the program causing the computer to execute:
detecting, from the image that is stored in an image memory that stores the image, a moving image area to be compressed by using a first compressor that compresses the image in the image memory in each period of time;
detecting, from an area that is compressed by the first compressor, a change area that has changed;
accumulating the change area and calculating an accumulated change area; and
transmitting, to a terminal device, a moving image obtained by the first compressor by converting a whole area of the image in the image memory to a moving image and the detected change area and transmitting, when the transmitting of the moving image and the detected change area ends, an image of the calculated accumulated change area, the image of the accumulated change area, which is an update area during the converting the whole area to the moving image, being compressed by a second compressor, image degradation of the second compressor being lower than that of the first compressor.

6. An image display method used for an image display system including an information processing apparatus and a terminal device, the image display method comprising:

by the information processing apparatus, detecting, from an image that is stored in an image memory that stores the image, a moving image area to be compressed by using a first compressor that compresses the image in the image memory in each period of time;

detecting, from an area that is compressed by the first compressor, a change area that has changed;

accumulating the change area and calculating an accumulated change area; and transmitting, to the terminal device, a moving image obtained by the first compressor by converting a whole area of the image in the image memory to a moving image and the detected change area and transmitting, when the transmitting of the moving image and the detected change area ends, an image of the calculated accumulated change area, the image of the accumulated change area, which is an update area during the converting the whole area to the moving image, being compressed by a second compressor, image degradation of the second compressor being lower than that of the first compressor, and the method further comprising:

by the terminal device, receiving the transmitted moving image compressed by the first compressor and the change area and displaying an image of a part of the received moving image, the part corresponding to the change area; and receiving, when the transmitting of the moving image ends, the transmitted image of the calculated accumulated change area and displaying the received image, the image of the accumulated change area being compressed by the second compressor.

7. An information processing apparatus comprising:

a processor; and a memory that stores the image, wherein the processor executes:

detecting, from an image that is stored in an image memory that stores the image, a moving image area to be compressed by using a first compressor that compresses the image in the image memory in each period of time;

detecting, from an area that is compressed by the first compressor, a change area that has changed;

accumulating the change area and calculating an accumulated change area; and transmitting, to a terminal device, a moving image obtained by the first compressor by converting a whole area of the image in the image memory to a moving image and the detected change area and transmitting, when the transmitting of the moving image and the detected change area ends, an image of the calculated accumulated change area, the image of the accumulated change area, which is an update area during the converting the whole area to the moving image, being compressed by a second compressor, image degradation of the second compressor being lower than that of the first compressor.

* * * * *